United States Patent
Margel et al.

(10) Patent No.: US 9,674,202 B1
(45) Date of Patent: Jun. 6, 2017

(54) TECHNIQUES FOR PREVENTING LARGE-SCALE DATA BREACHES UTILIZING DIFFERENTIATED PROTECTION LAYERS

(71) Applicant: Imperva, Inc., Redwood City, CA (US)

(72) Inventors: Shiri Margel, Petak Tikva (IL); Itsik Mantin, Shoham (IL); Amichai Shulman, Tel Aviv (IL)

(73) Assignee: Imperva, Inc., Redwood City, CA (US)

( * ) Notice: Subject to any disclaimer, the term of this patent is extended or adjusted under 35 U.S.C. 154(b) by 0 days.

(21) Appl. No.: 14/983,414

(22) Filed: Dec. 29, 2015

(51) Int. Cl.
H04L 29/06 (2006.01)

(52) U.S. Cl.
CPC ........ H04L 63/105 (2013.01); H04L 63/0428 (2013.01)

(58) Field of Classification Search
CPC .......................... H04L 63/105; H04L 63/0428
See application file for complete search history.

(56) References Cited

U.S. PATENT DOCUMENTS

| | | | |
|---|---|---|---|
| 4,588,991 A | 5/1986 | Atalla | |
| 4,768,087 A | 8/1988 | Taub et al. | |
| 4,984,272 A | 1/1991 | McIlroy et al. | |
| 5,023,907 A | 6/1991 | Johnson et al. | |
| 5,050,213 A | 9/1991 | Shear | |
| 5,412,726 A | 5/1995 | Nevoux et al. | |
| 6,158,010 A | 12/2000 | Moriconi et al. | |
| 6,256,739 B1 | 7/2001 | Skopp et al. | |
| 6,289,450 B1 | 9/2001 | Pensak et al. | |
| 6,349,289 B1 | 2/2002 | Peterson et al. | |
| 6,457,130 B2 | 9/2002 | Hitz et al. | |
| 6,460,163 B1 | 10/2002 | Bowman et al. | |
| 6,658,417 B1 | 12/2003 | Stakutis et al. | |
| 6,711,687 B1 * | 3/2004 | Sekiguchi | G06F 21/552 713/186 |
| 6,907,421 B1 | 6/2005 | Keshav et al. | |
| 7,139,811 B2 | 11/2006 | Lev Ran et al. | |

(Continued)

OTHER PUBLICATIONS

Non-Final Office Actoin from U.S. Appl. No. 14/983,423 mailed Oct. 12, 2016, 20 pages.

(Continued)

*Primary Examiner* — Michael Pyzocha
(74) *Attorney, Agent, or Firm* — Nicholson De Vos Webster & Elliott, LLP

(57) ABSTRACT

Techniques related to preventing large-scale data breaches utilizing differentiated data object (DO) protection layers are described. A security gateway placed within a communication path between client end stations and servers receives DO access requests from the client end stations. The DOs are divided into a first subset that are currently classified as active and a second subset that are currently classified as inactive based upon a likelihood of further legitimate access to the DOs. Those of the DO access requests for DOs determined to be in the first subset are subjected to a first protection layer utilizing zero or more protection mechanisms. Those of the plurality of DO access requests for DOs not in the first subset are subjected to a second protection layer utilizing one or more protection mechanisms. Large-scale data breaches are efficiently prevented without disruption to legitimate DO access requests.

38 Claims, 15 Drawing Sheets

(56) References Cited

U.S. PATENT DOCUMENTS

| | | | |
|---|---|---|---|
| 7,165,059 B1* | 1/2007 | Shah | G06F 3/0605 |
| 7,703,140 B2 | 4/2010 | Nath et al. | |
| 7,840,995 B2 | 11/2010 | Curran et al. | |
| 7,921,288 B1 | 4/2011 | Hildebrand | |
| 7,957,511 B2 | 6/2011 | Drudis et al. | |
| 8,230,061 B2 | 7/2012 | Hassan et al. | |
| 8,281,405 B1* | 10/2012 | Gaddala | H04L 63/101 |
| | | | 726/26 |
| 8,677,448 B1* | 3/2014 | Kauffman | G06F 17/30082 |
| | | | 726/1 |
| 9,015,838 B1 | 4/2015 | Northup | |
| 9,032,514 B1* | 5/2015 | Sankararaman | H04L 63/1408 |
| | | | 709/224 |
| 9,112,895 B1 | 8/2015 | Lin | |
| 9,152,808 B1* | 10/2015 | Ramalingam | G06F 21/62 |
| 9,166,993 B1* | 10/2015 | Liu | H04L 63/1425 |
| 9,256,727 B1 | 2/2016 | Manmohan | |
| 2002/0147689 A1 | 10/2002 | Falkner | |
| 2003/0018586 A1 | 1/2003 | Krahn | |
| 2003/0187806 A1 | 10/2003 | Banerjee et al. | |
| 2004/0103064 A1 | 5/2004 | Howard et al. | |
| 2004/0181459 A1 | 9/2004 | Wright | |
| 2009/0138592 A1 | 5/2009 | Overcash et al. | |
| 2009/0144545 A1 | 6/2009 | Dhuvur et al. | |
| 2009/0293121 A1* | 11/2009 | Bigus | G06F 21/316 |
| | | | 726/22 |
| 2010/0192201 A1 | 7/2010 | Shimoni et al. | |
| 2010/0325443 A1 | 12/2010 | Mattsson | |
| 2010/0325726 A1* | 12/2010 | Aoki | G06F 21/316 |
| | | | 726/22 |
| 2012/0089781 A1 | 4/2012 | Ranade et al. | |
| 2012/0180120 A1* | 7/2012 | Jain | H04L 63/0245 |
| | | | 726/11 |
| 2012/0210388 A1* | 8/2012 | Kolishchak | G06F 21/552 |
| | | | 726/1 |
| 2012/0222110 A1* | 8/2012 | Huang | H04L 43/028 |
| | | | 726/22 |
| 2013/0198521 A1* | 8/2013 | Wu | G06F 21/6209 |
| | | | 713/175 |
| 2014/0149381 A1* | 5/2014 | Chudnovskiy | G06F 17/30867 |
| | | | 707/709 |
| 2014/0165207 A1 | 6/2014 | Engel et al. | |
| 2014/0283120 A1 | 9/2014 | Mao et al. | |
| 2014/0325643 A1 | 10/2014 | Bart et al. | |
| 2015/0205954 A1* | 7/2015 | Jou | G06F 21/316 |
| | | | 726/22 |
| 2015/0249589 A1 | 9/2015 | Xiong | |
| 2016/0044182 A1 | 2/2016 | Leemet et al. | |
| 2016/0070905 A1* | 3/2016 | Antoun | G06F 21/50 |
| | | | 726/1 |
| 2016/0127367 A1 | 5/2016 | Jevans | |
| 2016/0162522 A1* | 6/2016 | Ganatra | G06F 17/30321 |
| | | | 707/741 |
| 2016/0277377 A1* | 9/2016 | March | H04L 63/08 |
| 2016/0306967 A1* | 10/2016 | Hart | G06F 21/56 |

OTHER PUBLICATIONS

"Case Study: Pelephone," 2014, 2 pages, Imperva, downloaded from http://www.imperva.com/docs/CS_Pelephone.pdf on Dec. 15, 2015.

"SecureSphere File Security Datasheet," 2014, 4 pages, Imperva, downloaded from http://www.imperva.com/docs/DS_File_Security.pdf on Dec. 15, 2015.

"Easy Digital Downloads," Mar. 6, 2014, 5 pages, downloaded from https://easydigitaldownloads.com/forums/topic/can-we-stamp-a-download-number-to-pdfs/ on Dec. 15, 2015.

"User Rights Management for Files," 2015, 8 pages, Imperva, downloaded from http://www.imperva.com/products/FileUserRightsManagement on Dec. 15, 2015.

"White Paper: 10 Building Blocks for Securing File Data," 2014, 5 pages, Imperva, downloaded from http://www.imperva.com/docs/WP_10_Building_Blocks_for_Securing_File_Data.pdf on Dec. 15, 2015.

"White Paper: Cutting IT Operations Costs for Unstructured Data," 2014, 11 pages, Imperva, downloaded from http://www.imperva.com/docs/WP_Cutting_IT_Operations_Costs_for_Unstructured_Data.pdf on Dec. 15, 2015.

R. Fielding et al., "Hypertext Transfer Protocol—HTTP/1.1," Jun. 1999, 114 pages, Network Working Group, Request for Comments: 2616, The Internet Society.

Notice of Allowance from U.S. Appl. No. 14/983,423, mailed Mar. 29, 2017, 11 pages.

* cited by examiner

ACTIVE DATA OBJECT IDENTIFIERS 112

| DATA OBJECT ID | CREATOR ID | CREATOR DEPT. | CREATION TIME | LAST ACCESS | TOT. ACC. | PD. ACC. | NUM. DIFF. USERS |
|---|---|---|---|---|---|---|---|
| /CONFIDENTIAL/X.DOC | JDOE | HR | 2015-02-04 08:20:14 PT | 2015-02-13 16:44:52 PT | 5 | 0 | 2 |
| /SHARED/Y.JPG | SSMITH | ENGINEERING | 2015-06-09 13:11:02 PT | 2015-09-22 20:12:32 PT | 2419 | 17 | 32 |
| ... | | | | | | | |

METADATA VALUES 402 — ENTRIES 404

PER-USER ACTIVE DATA OBJECT BUDGET 302

| USER ID | CURRENT BUDGET | ALLOCATED BUDGET | BUDGET EXPIRATION | PD-ACCESSED DATA OBJ. |
|---|---|---|---|---|
| USER 'A' | 196 | 200 | 2015-09-24 18:00:00 PT | /MARKETING/CONCEPTS.DOC |
| USER 'B' | 85 | 250 | 2015-09-24 18:00:00 PT | /SHARED/Y.JPG; /SHARED/X.DOC; ... |
| ... | | | | |

ENTRIES 406

INACTIVE DATA OBJECT USER-ACTIVITY RECORD 304

| USER ID | GRACE AMT | TEMP. ALLOCATION REMAINING | TEMP. ALLOCATION AMT. | TEMP. ALLOCATION EXPIRATION |
|---|---|---|---|---|
| USER 'A' | 3 | | | |
| USER 'B' | 0 | 12 | 30 | 2015-09-24 18:00:00 PT |
| ... | | | | |

ENTRIES 408

*FIG. 4*

TECHNIQUES FOR PREVENTING LARGE-SCALE DATA BREACHES UTILIZING DIFFERENTIATED PROTECTION LAYERS

FIELD

Embodiments relate to the field of computer networking; and more specifically, to techniques for preventing large-scale data breaches utilizing differentiated protection layers and techniques for unobtrusively protecting against large-scale data breaches utilizing user-specific data object access budgets.

BACKGROUND

In recent years, many organizations ranging from global business enterprises to governmental agencies have suffered from data breaches, which often result in the loss and/or disclosure of sensitive, confidential data such as financial information and personal information. Such confidential information could, if it fell into the wrong hands, have significant repercussions for the organization and people associated with the organization.

One cause of data breaches is due to insider threats, which are malicious threats to an organization that come from people within or directly associated with the organization (e.g., employees, former employees, contractors, business associates) who have inside information concerning the organization's security practices, data, and/or computer systems. Another cause of data breaches are "outside" malicious attackers that are not explicitly a part of the organization, but attempt to exploit or take over control of systems of the organization. Outside attackers can use a variety techniques to attack the organization, including using direct attacks, computer viruses, social engineering techniques, phishing, etc.

Data breaches can be persistent over a period of time, or occur only a certain point in time. For example, an insider may perform a data breach by acquiring small amounts of sensitive information over a long period of time, such as days, weeks, months, or even years. Alternatively, data breaches may occur over a comparatively brief period of time, such as when an attacker quickly acquires (e.g., downloads) a large amount of information from the organization, which can range from fractions of a second to minutes or longer.

Recently, many incidents of massive data breaches have occurred due to insider threats. One well-known example is the data breach initiated by Edward Snowden, who was a United States (U.S.) National Security Agency (NSA) Contractor and System Administrator that acquired approximately four terabytes (TB) of data from the NSA using four laptop computers. According to the NSA, this data allegedly included approximately 1.7 million classified documents, and was the most damaging (known) data breach to ever impact the U.S. Intelligence Community.

Another example of a massive data breach by an insider was from Chelsea Manning (born Bradley Manning), who worked as an intelligence analyst for the U.S. Army and acquired and disclosed approximately three-quarters of a million classified or unclassified but sensitive military and diplomatic documents via the WikiLeaks website.

One more example is the Anat Kamm-Uri Blau affair from 2007. In this breach, former Israeli soldier Anat Kamm, while working as an assistant in the Central Command bureau of the Israel Defense Forces (IDF), secretly copied thousands of classified and/or confidential documents and leaked this information to the Israeli Haaretz journalist Uri Blau.

Yet another prominent data breach that appears to result from an insider threat is known as the Sony data breach, which was discovered in November 2014 but likely had been ongoing for over a year. In this attack, the attackers claimed to have taken over 100 terabytes of data from Sony Pictures Entertainment. Sony later acknowledged that the hackers not only erased data from its systems, but also stole and subsequently released to the public pre-release movies, private communications, and sensitive documents such as salary schedules and social security numbers.

Organizations have attempted to prevent these types of data breaches by implementing file access controls to enforce permissions for accessing files. Typically, such file access control enforcement schemes involve configuring rules that limit which files (or groups of files, storage locations, etc.) may or may not be accessed by particular users (or user groups, etc.).

However, this approach of implementing and enforcing permissions for granting access to files has effectively been a failure. First, it is obvious that many large-scale data breaches continue to occur despite the existence and use of file access control systems. Moreover, as the amount of users and the amount of files and data in organizations continue to grow, it becomes exponentially more difficult for organizations to manage a "matrix" of user-to-file access permission configuration data. Further, implementing such file access controls can make collaboration between users within the organization very difficult, as the permissions for files may need to be modified very frequently to allow for the different types of permissible accesses by different users at different times.

Accordingly, there is a significant and growing need for techniques and systems to protect against large-scale data breaches without the substantial drawbacks of conventional approaches, such as those involving the use of file access controls.

BRIEF DESCRIPTION OF THE DRAWINGS

The invention may best be understood by referring to the following description and accompanying drawings that are used to illustrate embodiments of the invention. In the drawings:

FIG. 4 illustrates some exemplary data structures that can be utilized by a DPM according to some embodiments.

DESCRIPTION OF EMBODIMENTS

Figure 1:
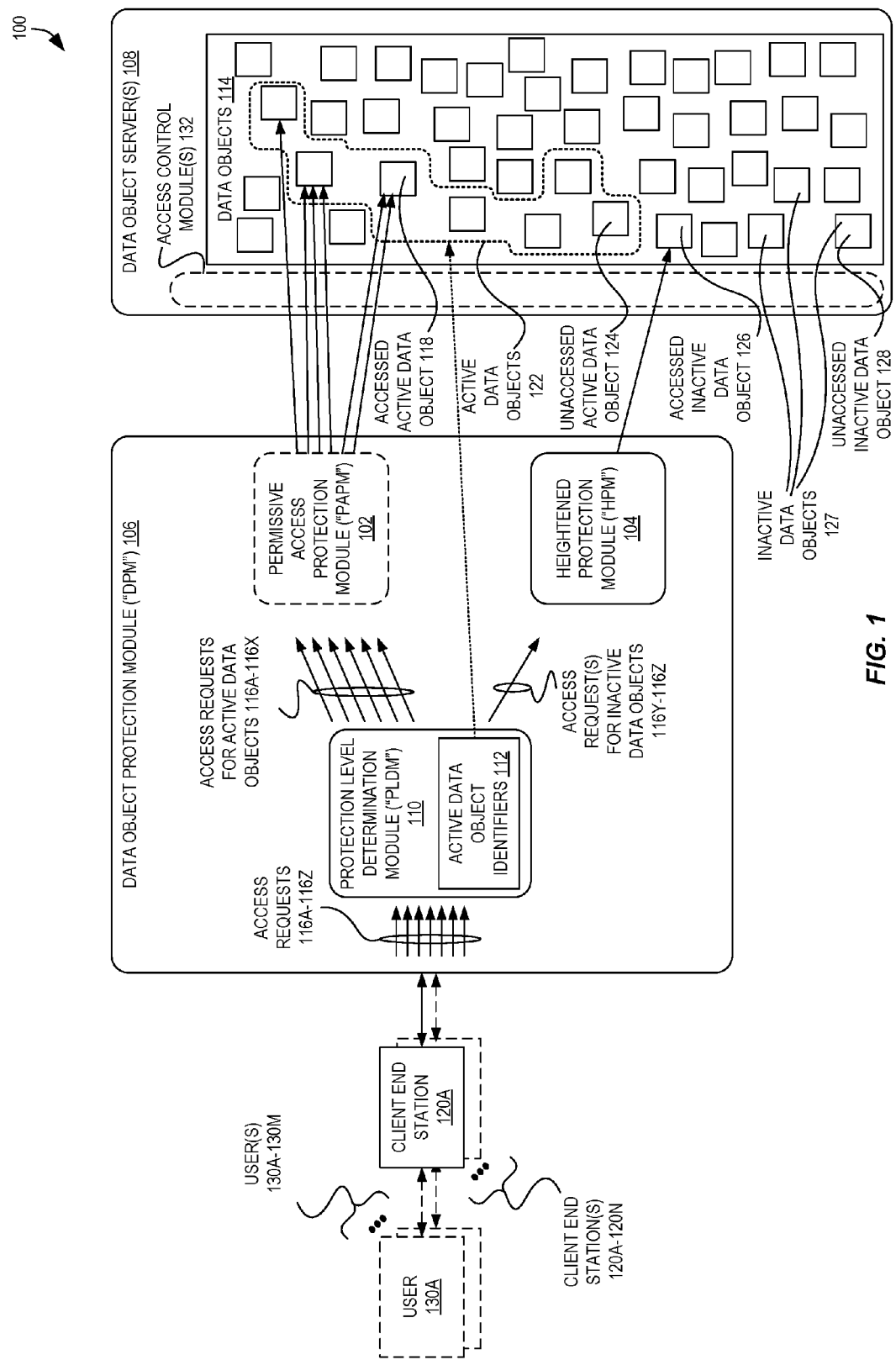
FIG. 1 is a block diagram illustrating a system for preventing large-scale data breaches utilizing differentiated protection layers according to some embodiments.

In the following description, numerous specific details such as logic implementations, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Moreover, reference numerals with suffix letters (e.g., 120A, 140N) may be used to indicate that there can be multiple instances of the referenced entity in some embodiments, though these multiple instances do not need to be identical but instead share some general traits or act in common ways. Further, the particular suffixes used are not meant to imply that a particular amount of the entity exists unless specifically indicated to the contrary.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. Further, although a Uniform Resource Locator (URL) is one type of Uniform Resource Identifier (URI), these terms may be used interchangeably herein to refer to a URI, which is a string of characters used to identify a resource.

The techniques shown in the figures can be implemented using code and data stored and executed on one or more electronic devices (e.g., an end station, a network device). Such electronic devices, which are also referred to as computing devices, store and communicate (internally and/or with other electronic devices over a network) code and data using computer-readable media, such as non-transitory computer-readable storage media (e.g., magnetic disks, optical disks, random access memory (RAM), read-only memory (ROM); flash memory, phase-change memory) and transitory computer-readable communication media (e.g., electrical, optical, acoustical or other form of propagated signals, such as carrier waves, infrared signals, digital signals). In addition, electronic devices include hardware, such as a set of one or more processors coupled to one or more other components, e.g., one or more non-transitory machine-readable storage media to store code and/or data, and a set of one or more wired or wireless network interfaces allowing the electronic device to transmit data to and receive data from other computing devices, typically across one or more networks (e.g., Local Area Networks (LANs), the Internet). The coupling of the set of processors and other components is typically through one or more interconnects within the electronic device, (e.g., busses, bridges). Thus, the non-transitory machine-readable storage media of a given electronic device typically stores code (i.e., instructions) for execution on the set of one or more processors of that electronic device. Of course, various parts of the various embodiments presented herein can be implemented using different combinations of software, firmware, and/or hardware.

Embodiments disclosed herein relate to the field of computer networking, and more specifically, techniques for preventing large-scale data breaches utilizing differentiated protection layers and techniques for unobtrusively protecting against large-scale data breaches over time utilizing user-specific data object access budgets.

In some embodiments, a Data Object Protection Module ("DPM") can be configured to prevent large-scale data breaches utilizing differentiated data object protection layers. In some embodiments, the DPM can monitor data object access requests sent by client end stations toward servers that seek access to data objects stored/served by those servers. The DPM can determine which of the data objects are classified as "active" data objects, where an "active" data object is one having a high likelihood of further legitimate access from users (e.g., of an organization) to the data object. For those data object access requests seeking access to a data object classified as active, the DPM can utilize process that access request using a "permissive" data object protection layer employing zero or more protection mechanisms. In some embodiments, this permissive data object protection layer cannot directly prohibit the data object access request from being served, and thus unobtrusively allow data object access requests to be further processed and/or provided to the destination server(s).

In contrast, for those data object access requests seeking access to a data object that is not classified as active—and thus may be "inactive," or comparatively unlikely to be legitimately accessed again—the DPM can subject that access request to a "heightened" data object protection layer that implements further protection mechanisms compared to the permissive data object protection layer utilized for active data objects. For example, the heighted data object protection layer may employ one or more protection mechanisms, which may be configured to potentially block a data object access request from being served.

The DPM can, in some embodiments, efficiently differentiate between those data objects classified as active versus other data objects (e.g., inactive data objects) by tracking identifiers of only the active data objects but not the inactive data objects. In many deployment environments, as the number of data objects that are "active" is significantly smaller than the number of data objects that are inactive, it is efficient (in terms of memory/storage and processing/lookup, for example) and thus possible for the DPM to differentiate between these data object classifications as it only needs to track a relatively small number of data objects. For example, in some deployments where there are millions of data objects (e.g., files), it may be the case that only a few thousand are active data objects, and thus only a few thousand data object identifiers are tracked by the DPM instead of millions.

Additionally, in some embodiments, the DPM can be configured to unobtrusively protect against large-scale data breaches over time utilizing user-specific data object access budgets. The DPM can monitor data object access requests, sent by client end stations on behalf of users, that are destined to data object servers and that seek access to data objects stored/served by those servers. For each received data object access request, the DPM can determine an access cost based on characteristics of the data object access request, and charge the determined access cost against a budget for the requesting user that is allocated for a particular time period. The determination of the access cost can be configured so that lower access costs will be generated for data object requests that are part of expected data object access consumption for users belonging to the enterprise, and likewise, higher access costs will be generated for data access requests that are not part of expected data object access consumption patterns for users of the enterprise. At or after (e.g., at an end of a time period) a budget for a user is exceed, the DPM can cause an alert message to be transmitted. However, in some embodiments the DPM does not prevent either the transmission of the corresponding data object requests on to the server(s) or further but different security-related analysis of the data object requests by other security systems. In these embodiments, because data object requests are not blocked by the DPM, the system is unobtrusive but is still able to protect against large-scale data breaches occurring over time. For example, a compromised insider (within or part of the organization) that attempts to slowly steal a large number of data objects over a long period of time can easily be detected early in the process when their one or more of their budgets are exceeded.

Notably, such user-specific data object access budget techniques can be independently used without the use of the differentiated data object protection layers as described above, and similarly, the use of differentiated data object protection layers for large-scale data breach prevention can be independently used without the use of user-specific data object access budgets introduced here. However, some embodiments incorporate and utilize both techniques together—i.e., both the use of differentiated data object protection layers and user-specific data object access budgets. As one example, the use of user-specific data object access budgets can be utilized as part of the zero or more protection of the permissive data object protection layer utilized for processing access requests for active data objects. Accordingly, it is expressly provided that the various techniques disclosed herein can be combined or used independently.

Accordingly, in various embodiments large-scale illegitimate access to data objects can be detected in a manner that is very practical for environments involving large numbers of data objects and/or users. In some embodiments, the use of these disclosed techniques can be extremely unobtrusive to non-malicious users who make appropriate access to the data objects (e.g., users of an organization performing normal work-related tasks), and thus can avoid disrupting collaboration between users and/or the typical day-to-day operations of large organizations. Moreover, in some embodiments the techniques can be used along with conventional access control systems without any special configuration required for the access control system or the large-scale data breach protection/detection systems disclosed herein.

For the purposes of this description, the term "data object" is used to refer to a variety of types of data, including but not limited to computer files. For example, a data object can be a file such as a word processing file, email message, text file, database file, document file, audio file, video file, audiovisual file, image file such as a raster image file or vector image file or page layout file, spreadsheet file, executable file, game file, font file, system file, settings file, compressed file, disk image file, source code file, backup file, etc.

Many data objects are stored using some type of durable storage (e.g., a "non-transitory computer readable storage medium") such as a hard drive, flash drive, optical drive, tape drive, etc. However, some data objects can also be generated dynamically and not exist as a single distinct unit on a non-volatile storage medium. For example, a data object can be a collection of data assembled by a computer program (e.g., a web application, a server), and may potentially include data from sources such as a database (e.g., one or more attribute values from one or more rows of data from one or more tables of a relational database), text file, etc. Such data objects can also potentially include several other data objects, i.e., be assembled from other data objects. In some embodiments, these types of assembled data objects could be, for example, a webpage that serves as part of a web application that is provided to users, such as a wild page assembled using data stored in a database and/or code from the web application. Some of these assembled data objects may be transmitted to other devices as a file, and this file itself may or may not be persisted by the device that assembled the file. Accordingly, the term "data object" is to be broadly construed as covering a variety of types of data, where files are just one type of data object.

FIG. 1 is a block diagram illustrating a system 100 for preventing large-scale data breaches utilizing differentiated protection layers according to some embodiments. FIG. 1 includes a Data Object Protection Module ("DPM") 106 that is communicatively coupled between one or more client end stations 120A-120N and one or more data object servers 108. In some embodiments, the DPM 106 can be placed "inline" on a communications path between the client end stations 120A-120N and the one or more data object servers 108 such that traffic passing between will flow through the DPM 106. However, in other embodiments, the DPM 106 need not be situated inline (i.e., directly within this communications path); some of these embodiments will be presented with further detail later herein with regard to FIGS. 14 and 15.

Each of these client end stations 120A-120N can be a computing device operable to execute one or more applications seeking to communicate with the data object servers 108. There are a wide variety of types of client end stations 120A-120N, including but not limited to workstations/Personal Computers (PCs), server computers, laptops, netbooks, mobile phones, smartphones, multimedia phones, smart watches and other wearable devices, Voice Over Internet Protocol (VOIP) phones, user equipment (UE), terminals, portable media players, Global Positioning System (GPS) units, gaming systems, set-top boxes, etc.

Each client end station 120A-120N may or may not operate on behalf of one or more users 130A-130M. For example, a client end station 120A can be assigned to a user 130A by an organization, in which case the client end station 120A may be a "managed" device that is subject to control (e.g., technological, contractual, etc.) by the organization. However, the client end stations 120A-120N can also be "unmanaged" devices not subject to control of the organization—for example, client end station 120A could be a cellular phone or tablet privately owned by a user 130A.

Similarly, the data object servers 108 can be any of a variety of types of applications that can provide access to data objects 114, including but not limited to web servers (e.g., such as those implementing aspects of enterprise collaboration systems such as SharePoint by Microsoft™, Jive by Jive Software, Confluence by Atlassian, Basecamp by Basecamp (formerly 37signals), etc.), file servers, etc. The client end stations 120A-120N and data object servers 108 may seek to communicate using any of a variety of protocols, including but not limited to utilizing HyperText Transfer Protocol (HTTP), HTTP over TLS/SSL (HTTPS), Telnet, File Transfer Protocol (FTP)/FTP Secure (FTPS), Simple Mail Transfer Protocol (SMTP), Internet Message Access Protocol (IMAP), Post Office Protocol (POP), Simple Network Management Protocol (SNMP), Network File System (NFS), Server Message Block (SMB), Common Internet File System (CIFS), Apple Filing Protocol (AFP), Web Distributed Authoring and Versioning (WebDAV), etc.

The client end stations 120A-120N may or may not operate within a same network as the data object servers 108. For example, in some embodiments one or more of the client end stations 120A-120N may connect to the data object servers 108 over one or more public networks (e.g., the Internet), but in some embodiments the client end stations 120A-120N can operate within a same private network (e.g., a Local Area Network (LAN)) as the data object servers 108 or remotely connect (e.g., via a Virtual Private Network (VPN) connection) to a same private network as the data object servers 108.

Regardless of their location, the client end stations 120A-120N can transmit data object access requests 116A-116Z seeking access to one or more data objects 114 stored and served by data object servers 108. For example, the users 130A-130M may work for an organization and seek to access data objects 114 (e.g., open a spreadsheet or word processing document) as part of their typical organizational duties. However, some of these access requests 116A-116Z may be part of a large-scale data breach, where a user attempts to access a large number of data objects 114 over time for improper purposes, such as providing information to a competitor of the organization, leaking sensitive information, exploiting sensitive organizational data, etc.

Thus, in some embodiments utilizing differentiated protection layers to prevent large-scale data breaches, the access requests 116A-116Z are received by the DPM 106 and processed by a protection level determination module ("PLDM") 110. The PLDM 110 can be configured to determine which of these access requests 116A-116Z are seeking access to data objects 114 that are currently classified as being active data objects.

In some embodiments, one or more of the data objects 114 are classified as "active" data objects 122 (as opposed to being "inactive" data objects 127, for example). In various embodiments, this classification can occur at a remote entity (e.g., a management server 1410 of FIG. 14), at the DPM 106, or at both places.

An active data object is one that, for any of potentially a variety of reasons, can be determined to have a high likelihood of being further accessed for legitimate purposes from the perspective of the organization or data object owner(s). Similarly, an inactive data object is one that, for any of potentially a variety of reasons, can be determined to have a low likelihood of being further accessed for legitimate purposes from the perspective of the organization or data object owner(s).

The distinction between what is a "low" likelihood and "high" likelihood can be flexibly configured according to the capabilities of the particular system and the desires of the entity implementing the system. For example, in some embodiments, those data objects that are known to be extremely unlikely to ever be accessed again for a legitimate purpose will be classified as "inactive," but in other embodiments, the "inactive" threshold may instead only require that a data object be determined to be "somewhat" unlikely to ever be accessed again for legitimate purposes.

Accordingly, the legitimate access threshold that defines a cutoff line between active and inactive can flexibly be adapted based upon the needs of the particular implementation; however, generally it is desired that the number of data objects classified as active is smaller than the number of data objects classified as inactive. Thus, in some embodiments the number of active data objects may be less than 50% of the data objects, but in other embodiments the portage of data objects that are active may be less than 10%, 5%, 1%, 1/10%, etc. Accordingly, having a comparatively small number of active data objects can ensure that access request processing can be performed quickly, e.g., identifiers of the active data objects may be completely stored in volatile memory or quickly accessed from a non-volatile memory for the purpose of determining whether a requested data object is active.

The classification of data objects as being active data objects can be performed at an initial point in time (e.g., when an embodiment is deployed to an active system having existing data objects 114), periodically, and/or "on the fly" as certain events occur warranting that a particular classification be made. The classification can occur using rules configured manually (e.g., by a system administrator), generated using machine learning techniques, etc.

The initial and/or periodic data object classification can occur either directly, indirectly, or using a combination of both approaches. For example, some embodiments utilize a direct approach where the classification system is configured to, using particular rules, identify data objects as belonging to the "active" set. Alternatively, some embodiments utilize an indirect approach, where the classification system is configured to, using particular rules, identify data objects as belonging to the "inactive" set and thus, the active data objects can then be inferred through the process of exclusion—i.e., those of the data objects that are not known to be inactive are thus active. Additionally, some embodiments utilize a combination of both direct and indirect approaches, where both "active" data objects are identified using one or more rules, "inactive" data objects are identified using one or more rules, and any remaining non-classified data objects (if they exist) can be assigned to either set according to the desires of the system implementer. Additionally, the on-the-fly data object classification can occur upon receipt of a data object request (from a client end station 120A) or response message (from a data object server 108) being sent that indicates that a data object will be or has been created. In this case, subject to the request or response satisfying one or more rules, the corresponding data object can be classified as active.

For the purpose of illustration, in some embodiments inactive data objects 127 can include those data objects that have not been accessed by any user 130 in a particular recent threshold amount of time (e.g., one week, one month, six months, one year, etc.), data objects that were created at least a particular amount of time in the past, data objects having a particular size (e.g., a certain number of bytes) or filename, etc. As additional examples, inactive data objects 127 can include those data objects that belong to a particular type of data object that is known to not be legitimately accessed by users 130, such as a "temporary" file (e.g., a file created by an application or operating system that is for use by that application or operating system, and thus, not by a human user), database table or index storage structure (as they are used by database applications and not typically by any user that would request access to them), etc. Similarly, inactive data objects 127 can include those data objects that were created by particular users/entities.

As further examples, in some embodiments the active data objects 122 can be those data objects that satisfy one or more criteria, such as whether they were accessed a threshold number times during a particular time period (e.g., accessed more than once in the last six months), were created during a particular recent time period (e.g., created within the last three months), have a particular data object type (e.g., are word processing documents), are stored in a particular storage location (e.g., are files within a particular directory or include a particular file system path), have a particular filename, were created or owned by a particular user (or group of users, etc.), or any of a variety of other criteria.

Accordingly, in some embodiments, each of the access requests 116A-116Z includes an immutable identifier of a data object. An immutable identifier can be a file name, a unique identifier of a data object within a particular context, a file storage location or path of a file, etc. Accordingly, the immutable identifier can identify a particular data object resource, regardless of whether the content of that data object changes.

Thus, the immutable identifier of an access request 116Z can be used by the PLDM 110 to determine whether the corresponding data object is currently classified as active. For example, the PLDM 110 can utilize a data structure along with an immutable identifier (e.g., as a lookup key) to determine whether the corresponding data object is currently classified as active. For example, the PLDM 110 can utilize a set of active data object identifiers 112 (e.g., a list of immutable identifiers) and determine whether a particular immutable identifier of an access request is in a set of active data object identifiers 112. Of course, many different data structures known to those of skill in the art can be used for this purpose, including but not limited to arrays, lists, hash tables, trees, tries, Bloom filters, databases, etc.

In some embodiments, the active and/or inactive classification scheme(s) result in that a greater amount of the data objects 114 are classified as inactive compared to active. For example, in some embodiments the percentage of data objects 114 that are active data objects 122 is less than fifty percent, and in some embodiments the percentage can be ten percent, five percent, one percent, or even fractions of one percent (e.g., 0.1%, 0.01%). Accordingly, the set of active data object identifiers 112 can be kept quite small, thus enabling the efficient tracking of active data objects and processing of access requests 116 by the DPM 106, in contrast to conventional access control techniques employing per-data object records of access permissions for particular users/groups, which can require a huge amount of memory/storage and processing time for performing look-ups when the number of data objects 114 is large (as occurs in modern organizations).

As a result, a majority (which is an overwhelming majority in many cases) of the access requests 116A-116Z will be determined to be for the comparatively small number of active data objects by the PLDM 110, and these access requests 116A-116X may be processed using a permissive access protection module ("PAPM") 102.

As indicated by the dashed lines of the PAPM 102 illustrated in FIG. 1, in some embodiments, the PAPM 102 can be configured as an "open door" and thus may not process these requests and instead, simply allow the access requests 116A-116X for active data objects to continue their flow, e.g., be processed by another module (not illustrated, such as a module of a security gateway) that analyzes traffic for different security-related reasons, or be sent on to the data object server(s) 108 to be served. However, in some embodiments, the PAPM 102 can provide additional processing. For example, the PAPM 102 may be configured to perform budget-related processing involved in embodiments implementing the budget-based techniques for unobtrusively protecting against large-scale data breaches over time that are discussed later herein (see, e.g., FIG. 2, FIG. 3, etc.)

In contrast, those of the access requests 116A-116Z that are access requests 116Y-116Z for inactive data objects can be processed by a heightened protection module ("HPM") 104 that implements more thorough and/or restrictive protections than the PAPM 102. For example, in some embodiments the HPM 104 can further process these access requests 116Y-116Z and potentially even block these access requests 116Y-116Z from even being sent on to the data object servers 108, whereas in some embodiments the PAPM 102 is not able to block requests. In some embodiments, the HPM 104 can implement restrict access to inactive data objects using grace periods and/or temporal allocation amounts, protect inactive data objects using encryption schemes, etc., examples of which will be discussed later herein.

Accordingly, embodiments utilizing such a multi-protection layer scheme can thus subject those comparatively few access requests 116Y-116Z seeking access to inactive data objects (i.e., those data objects that are unlikely to be accessed for legitimate reasons) to additional scrutiny and possibly even block these access requests 116Y-116Z from being served, whereas the expected large majority of access requests 116A-116X for active data objects will be subject to less scrutiny and will not be blocked by the DPM 106, thereby greatly reducing the possibility of the system interfering with the bulk of the typical operations of the organization (e.g., inadvertently blocking legitimate requests). Accordingly, the system 100 remains unobtrusive while being able to detect and/or prevent large-scale data breaches.

As a result, the depicted embodiment of FIG. 1 illustrates how a very large amount of the data object access requests 116A-116Z (e.g., data object access requests 116A-116X) will be processed using the PAPM 102 and will access a number of active data objects 118. Additionally, a very small amount of the data object access requests 116A-116Z (i.e., data object access requests 116Y-116Z) will be processed using the HPM 104, here illustrated as resulting in one inactive data object 126 being accessed. Although FIG. 1 shows some un-accessed active data objects 124 and unaccessed inactive data objects 128, this is merely illustrative of one possible scenario.

FIG. 1 also illustrates one or more access control module(s) 132 that can be used in some embodiments. The access control module(s) 132, which is illustrated as being part of data object servers 108 but can be located elsewhere (e.g., as a separate module on a same server computing device or at another server computing device, etc.), can be used to implement additional, conventional access control protections that are typically on a per-file basis. Thus, while in some cases the DPM 106 may not block (i.e., it will allow) an access request, the request can still potentially be blocked by the access control module(s) 132. Accordingly, embodiments using both techniques can easily and powerfully protect (particularly sensitive) data objects using the access control module(s) 132 and also protect against large-scale data breaches using the DPM 106. In such embodiments, the system administrator can potentially thus focus any access control mechanisms upon a small set of very important data objects instead of needing to intensively and continually configure access control mechanisms for every single data object in a system, although this is also possible.

Figure 2:
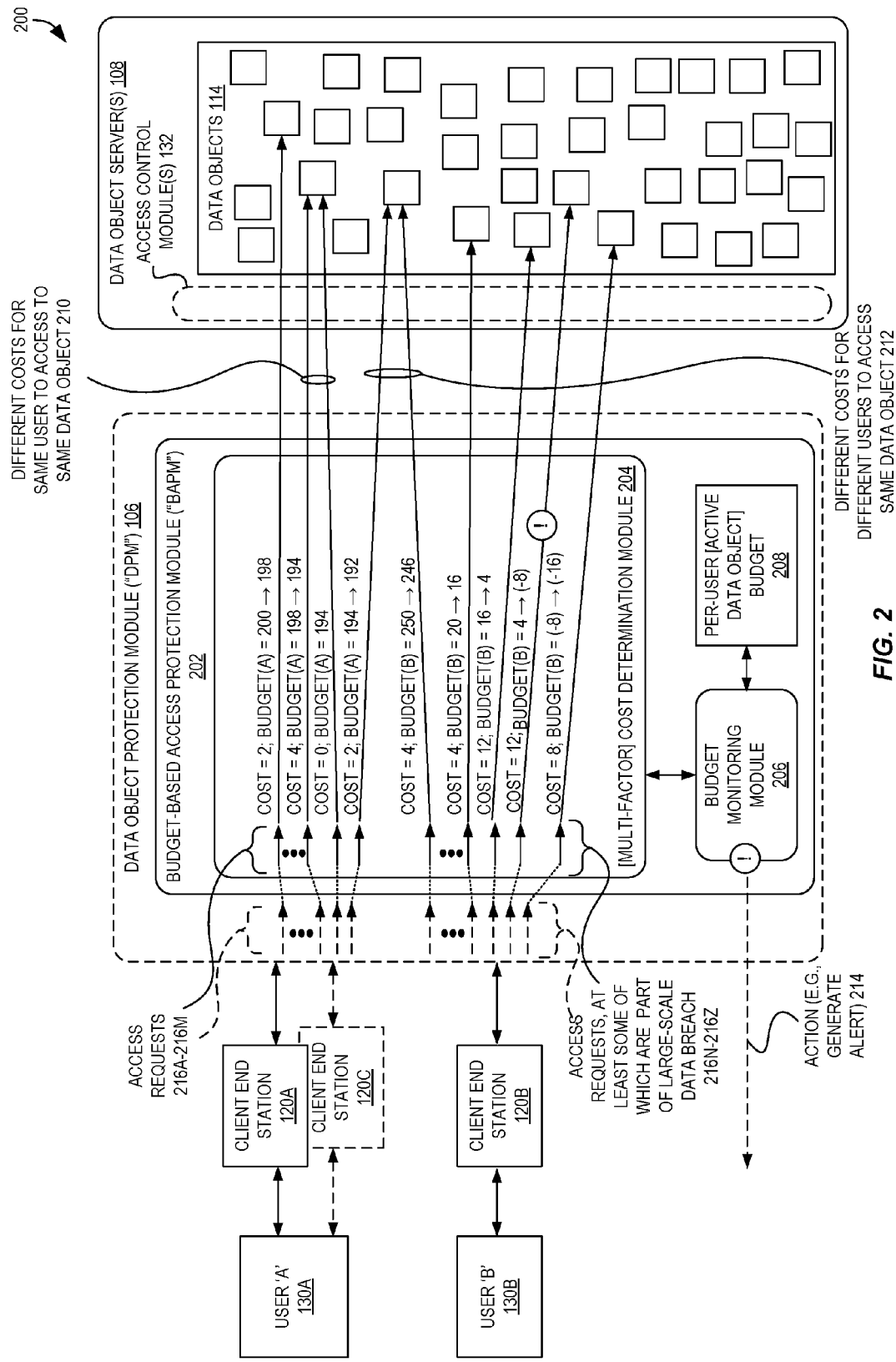
FIG. 2 is a block diagram illustrating a system for unobtrusively protecting against large-scale data breaches over time utilizing user-specific data object access budgets according to some embodiments.

Some embodiments can also or alternatively utilize a budget-based approach. FIG. 2 is a block diagram illustrating a system 200 for unobtrusively protecting against large-scale data breaches over time utilizing user-specific data object access budgets according to some embodiments. FIG. 2 illustrates data object servers 108, client end stations 120A-120B (and optionally 120C), and two users (user 'A' 130A and user 'B' 130B). User 'A' 130A may use one client end station 120A or two client end stations 120A-120C to send access requests 216A-216M for one or more data objects 114. Similarly, user 'B' 130B may use one client end station 120B to send access requests 216N-216Z, at least some of which are part of a large-scale data breach.

In FIG. 2, a budget-based access protection module ("BAPM") 202 is illustrated that analyzes the access requests 216A-216Z using a cost determination module 204 in conjunction with a budget monitoring module 206 and per-user budget 208. In some embodiments, the BAPM 202 can be the PAPM 102 of FIG. 1 and thus be utilized within the DPM 106 of the differentiated data object protection layer system disclosed therein for use with access requests for active data objects. However, the BAPM 202 can also be utilized on its own.

The BAPM 202 can be configured to prevent massive data leaks. Notably, a small portion of data leakage is negligible, and thus a discovery of a data breach after a small portion of data has already been leaked is acceptable, especially when viewed in light of the significant problems resulting from being overly protective/paranoid in terms of human time, effort, cost, and detriment to the workflow of typical users.

The BAPM 202 can unobtrusively detect large-scale data breaches by keeping track of the amount of data objects that users read/access. As it may not be critically important to know which individual data objects were read, the BAPM 202 can possibly forego certain data object-specific logging and instead focus upon user budgets. To keep track of the amount of data objects each user reads, each user can be allocated a budget for accessing data objects. The budget can be a "fixed" budget that may be renewed at the end of a time period (e.g., every week, two weeks, month, etc.). When a user attempts to access a data object, a cost can be deducted from the user's budget for that period. Based upon the resulting budget amounts, the BAPM 202 can detect and signal (e.g., provide alerts) when users diverge from their regular data object usage patterns. Moreover, embodiments can compare between different users' data object use, examine and detect when a user data object activity is different compared to previous time periods and/or to peer group data object usage amounts. Moreover, embodiments can decide whether to inform the user's manager or security administrator of such detected variances and let those users decide whether and how to handle such budget variations.

Accordingly, the BAPM 202 can be configured to receive access requests 216A-216Z sent by client end stations 120A-120C on behalf of users 130A-130B of an enterprise. In some embodiments, the data object access requests seek access to one or more of the data objects 114 stored by the one or more data object servers 108, and each can include an immutable identifier of one of the data objects as described above.

In some embodiments, each of users 130A-130B is allocated a budget for each of one or more time periods. The time periods can be consecutive and non-overlapping in nature. For example, a first time period can be a week, and when that week is finished, another second time period begins and a "new" budget for each user and that is associated with that time period is used.

However, the time periods (and thus, the per-user allocated budgets) can also overlap. For example, in some embodiments each user is allocated a first budget for a first time period (e.g., a week) and also allocated a second budget for a second time period (e.g., a month). These two time periods may overlap such that any costs determined for access requests occurring during the first time period may be deducted from both the first budget and also the second budget. Thus, one or multiple budgets and corresponding time periods may be in force at any one point in time, and these time periods may overlap in full, overlap in part, or not overlap at all.

The budget amounts can be assigned in a variety of ways, such as by an amount selected manually (e.g., by a system administrator) or programmatically. For example, in some embodiments during an initial deployment time, each user may be assigned a relatively large budget in order to avoid creating false positive alerts. In some such embodiments, during the first few time periods of operation, the budget trends of each user and/or peer group can be learned and each user's budget for current and/or future time periods can be updated accordingly.

The budget amounts, in some embodiments, are purposefully set such that a large majority of users will not exceed their allocated budget for any or many time periods. This configuration operates according to the principle that a vast majority of an organization's users will not be committing large-scale data breaches, and ensures that the system is unobtrusive to these users.

In some embodiments, each user is assigned a same budget amount (as the next user), but in other embodiments the users may be flexibly assigned different budgets. For example, some embodiments assign different budgets to different users based upon the department or job title of the user, which can allow for different types of users to be treated similarly compared to their peers performing the same types of tasks. Although some embodiments can determine and allocate budgets that are specific to particular users (e.g., based upon previous access request history of particular users), other embodiments do not allocate user-specific budgets (or use budget limits/caps) to avoid potentially granting a user a large enough budget to continue performing a large-scale data breach if they have previously been accessing large numbers of data objects (and this history of previous data accesses was used to set that user's budget).

Moreover, in some embodiments using overlapping time periods, the budgets of the overlapping time periods can be set in a variety of ways to achieve particular desired protections. For example, the budget for a four-week period that overlaps a two-week period need not be precisely double the budget of the two-week period despite its time length being double that of the two-week period.

Thus, in some embodiments the larger time period may be set to be larger than the relative difference between the time periods—e.g., a four-week period could have a budget of 1000 whereas the two-week period only has a budget of 200. Such a configuration could allow the system to detect particularly egregious, long-term accesses of a very large amount of data objects that are very likely problematic due to the larger time-period's budget being exceeded. As a result, the system could increase a level of severity of an alert message transmitted to a manager or security administrator, for example.

Similarly, in some embodiments the budget of the larger time period can be set to be less than the relative difference between the time periods—e.g., a four-week period could have a budget of 300 whereas the two-week period only has a budget of 200. This configuration can allow the system to detect those users making a prolonged withdrawal of data objects, where the user's accesses may not exhaust the budget of many (or any) of the shorter duration time periods but still exhaust the budget of the longer duration time period(s). Continuing the example, if a user requests 175 data objects during a first two-week period and another 175 data objects in a following two-week period, the user may not exhaust either of the two-week time period budgets (as 175 is less than 200) while still exhausting the budget of the four-week period (as 350 is larger than 300).

The budget determination/allocation process can be performed by the BAPM 202; however, in some embodiments the budget determinations are performed by another entity (e.g., the management server 1410 of FIG. 14) and the budgets can thus be provided to the BAPM 202 periodically. Regardless, the per-user budgets 208 can be stored by the BAPM 202 and utilized by the budget monitoring module 206 to keep track of user budgets.

Accordingly, for each data object access request received at the BAPM 202, the cost determination module 204 can determine an access cost for that data object access request based on characteristics of the access request. In some embodiments, this determination is made based upon multiple different factors/characteristics, and thus the cost determination module 204 can optionally be a multi-factor cost determination module 204.

In some embodiments, lower access costs are indicative of data object access requests that are part of expected access consumption patterns for the users of the enterprise, and thus, higher access costs are indicative of data object access requests that are not part of expected data object access consumption for the users of the enterprise.

With a determined access cost for each access request, the budget monitoring module 206 can then charge the determined access cost against the budget for that user corresponding to the zero, one, or multiple time periods that are currently effective (e.g., based upon a time when the data object access request was received). For example, in some embodiments the access cost is subtracted from the current remaining budget for each currently in force time period.

When the budget monitoring module 206 determines that a budget for a user for a time period has been exceeded, the budget monitoring module 206 can be configured to take an action 214 such as transmitting one or more alert messages to certain other entities/people. For example, in some embodiments, the budget monitoring module 206 can transmit an alert message to a manager of the user having the exceeded budget and/or to a security administrator of the enterprise. The content of the alert and/or the particular recipient alert can be determined based upon a variety of factors, including but not limited to whether the budget-exceeding user has violated budgets for any other time periods, whether the user has violated the budget(s) by a particular threshold amount, where the client end station of the user is located, etc. Accordingly, the content of the alert message (e.g., a severity of the alert message) and/or the particular recipient(s) can be flexibly selected based upon the particular scenario.

As one example, an alert severity can be configured based upon how far past the budget the user has gone. For example, if a user first exceeds a budget, an initial alert message can be sent. If the user then exceeds the budget by 10%, a "low" severity alert message can be sent. If the user continues to exceed the budget, different severities of alert message can be sent—e.g., exceeding the budget by 30% can result in a "medium" severity alert message, exceeding by 100% can result in a "high" severity alert message, exceeding by 1000% can result in a "critical" or "very high" severity alert message, etc.

Regardless of whether a budget is exceed, in some embodiments the BAPM 202 is configured to allow the access requests 216A-216Z to be passed onward (e.g., for other security-related processing by another module of a security gateway, or on to the data object servers 108 to be processed) and thus, will not directly block any of the access requests 216A-216Z. This ensures that the detection/protection does not impact the legitimate traffic of the enterprise, at only a slight cost of a few extra data objects (perhaps) being able to be successfully retrieved before some sort of remedial action can be implemented (e.g., by those users receiving the alerts) if necessary.

In some embodiments, the number of "extra" data objects that a malicious user can access during this time (i.e., when one or more current budgets are exceeded) can be reduced by configuring the BAPM 202 to simply delay the forwarding on of these requests 216A-216Z (to another security module, or to the data object servers) by an amount of time. This can result in the user 130B being able to access (e.g., retrieve) fewer data objects over a particular time period while the budget is exceeded, as the time to access additional data objects is increased. This technique can provide additional time for detecting and properly mitigating a large-scale data breach while not significantly disrupting the workflow of typical users. For example, when a user exceeds a current budget in a relatively short amount of time, it is likely that the user is performing many copy-type operations instead of performing a mix of reads, writes, etc., that result from more typical interactions with data objects. Thus, regardless of whether such copy-type operations are legitimate, an introduced delay should only minimally affect users performing legitimate accesses while still being able to significantly impact illegitimate accesses.

Moreover, in some embodiments, this introduced delay can be "stepped-up" as the budget is further exceeded, meaning that the delay that the BAPM 202 introduces before passing on a request can be increased (e.g., linearly, exponentially) with each successive access request from that user that is received while the budget is exceeded. Thus, in some embodiments, the amount of delay introduced for a request can be set based (in whole or in part) upon how far the user has exceeded their budget(s).

In various embodiments, the determining of the access cost, the charging of the costs to the budgets, and/or the taking action (e.g., sending alerts) can occur at multiple points of time and can be performed at various locations. For example, in some embodiments the determination, charging, and/or corrective action can occur "on-the-fly" and thus occur upon receipt of each access request (e.g., 216A). In some embodiments, one or more of these three operations can be performed for each access request 216A before that access request 216A will be passed on.

However, in some embodiments, one or more of the access cost determination, charging, and or corrective action can occur at different points in time. For example, in some embodiments these operations can occur (e.g., in a batch manner) at the end of one of the time periods, where all of these operations occur for access requests received during that time period and/or for other time periods.

Further, some embodiments use both on-the-fly processing as well as periodic processing (e.g., at the end of certain time periods) to, for example, perform multiple actions which may or may not be the same. For example, in some embodiments the BAPM 202 can perform access cost determination, charging, and or corrective action operations substantially on-the-fly to generate and send a first type of alert message, and again perform correction action operations at the end of the period to send a second type of alert message. By performing some corrective action on-the-fly, it is possible for a faster response to be made in cases where a large-scale data breach can be readily determined to actually exist. For example, in some cases an on-the-fly alert message could be sent to a manager of the budget-exceeding user, and if the manager knows that the user is about to leave the company, the manger can rapidly take action. As another example, on-the-fly alert message could be sent to a security administrator of the enterprise or a Security Information and Event Management (SIEM) program, either of which could use the knowledge of this particular alert together with other network hardware/application information to more immediately determine whether a large-scale data breach may be occurring.

Focusing back upon FIG. 2, two example scenarios are illustrated to aid in the understanding of aspects of the depicted embodiment. First, user 'A' 130A (via a first client end station 120A and possibly even a second client end station 120B) issues access requests 216A-216M for certain data objects.

The first access request 216A is received, and a cost of "2" is determined for this access, which can be a somewhat "low" cost indicating that the access request largely meets the expected data object access consumption pattern for the users of the enterprise. The budget for user 'A' 130A—which initially was allocated with a value of "200"—can be charged to result in a new budget available of "198" via simple subtraction. The access request is then passed on (e.g., to data object servers 108) for further processing.

After some amount of time and potentially subsequent (but not illustrated) access requests, a next-illustrated access request is received that has a determined cost of "4", meaning that it is slightly less in conformity with the expected data object access consumption pattern for the users of the enterprise than the first access request. As a result, the charging brings the user 'A'-specific budget from "198" to "194." Similarly, a next access request is received and a cost of "0" is determined, and thus the charging results in the budget staying at "194." Note that in this case, this access request is for a same data object that was previously requested, though in this case the determined cost of "0" was different than the earlier cost of "4"—and thus, the system can generate different access costs for a same user to access a same data object 210. This scenario can result from a variety of different types of access cost determination rules. For example, a rule could specify that if a user has recently (i.e., within a recent threshold amount of time) accessed the same data object, the subsequent cost to again access the data object is zero. Further detail regarding some cost determination rules will be described later herein with respect to FIGS. 10 and 11, for example.

Next, user 'A' 130A causes another access request to be sent on his/her behalf by one of the client end stations 120A/120C, which results in a determined cost of "2" and leads to the budget being charged to result in the user-specific budget being decreased from "194" to "192." In this illustrated embodiment, we assume that the budget monitoring module 206 is configured to determine that an action 214 will result when the budget becomes negative, i.e., is less than zero. Since that is not the case for user 'A' 130A, no action 214 results.

User 'B' 130B similarly is depicted as causing several access requests 216N-216Z to be sent upon his/her behalf; however, this set of access requests 216N-216Z includes at least some access requests that are part of a large-scale data breach.

In this case, we assume that user 'B' 130B has been allocated "250" budget, and with a first access request having a determined cost of "4", the budget is charged to result in an updated budget of "246." However, in this case, the cost to access a particular data object is "4" whereas a cost for user 'A' 130A to access the same data object was only "2." Thus, different costs are determined for different users to access a same data object 212, which can result from one or more different criteria being different between the two access requests (e.g., a time of day, whether the requesting client end station is a known or managed device, etc.)

After some amount of time and subsequent access requests (not illustrated), a next-illustrated access request is received that has a determined cost of "4", resulting in the budget being charged from "20" down to "16," and then another access request is received that has a determined cost of "12", resulting in the budget being charged from "16" to "4." Upon a next access request with another determined cost of "12," the budget is charged from "4" to "−8." Per the earlier-assumed triggering condition (i.e., upon a budget for a user becoming negative), the budget monitoring module 206 will perform an action 214, for example, transmitting an alert message. However, the BAPM 202 will permissively allow the access request that caused the triggered action to occur to continue on for additional different processing and/or be sent on to the data object server(s) 108 for the request to be processed. Similarly, another access request will be received at the BAPM 202 that results in a determined cost of "8," further causing the budget to be charged from "−8" to "−16." In some embodiments, each access request resulting in a negative budget can cause an action, and thus in these embodiments an action will occur after each of the last two illustrated access requests where the budget ends at "−8" and "−16"; however, in other embodiments only the first access request causing the budget to go from non-negative to negative will result in an action 214, and in yet other embodiments, multiple triggering conditions can be set so that different actions 214 will be performed for different budget values (e.g., send a message to a manager upon the budget first becoming negative, send a different message to a security administrator upon the budget first becoming less than "−25", etc.)

As indicated above, the budget monitoring module 206 can also be configured to perform corrective action analysis at various points in time. For example, the budget monitoring module 206 may be configured to perform an action upon a budget first being exceeded (e.g., first passing a threshold value), perform another action at the end of a time period in which the budget was exceeded (optionally by a particular amount), perform another action at the end of the time period in which the user has been determined to have exceeded the budget for multiple time periods, perform another action at the end of a time period based upon a comparison of a user's resulting budget compared to the resulting budget of other users, etc.

Figure 3:
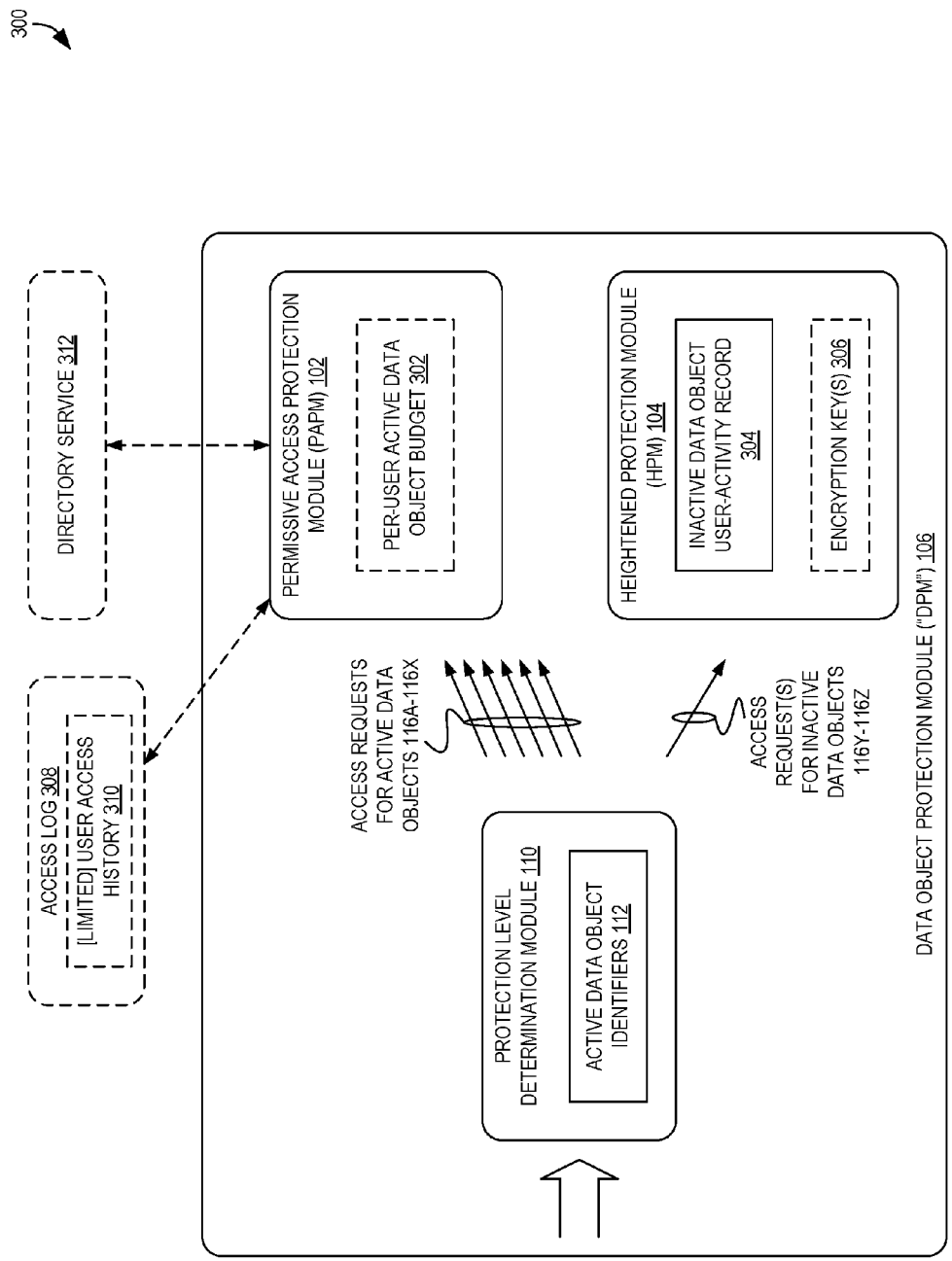
FIG. 3 is a block diagram illustrating exemplary components of a Data Object Protection Module ("DPM") according to some embodiments.

For further detail regarding some of the different data structures that can be utilized to implement the differentiated protection layer and/or budget-based techniques introduced above, we turn to FIG. 3, which is a high-level block diagram illustrating exemplary components 300 of a DPM 106 according to some embodiments.

As described with regard to FIG. 1, the DPM 106 can include a protection level determination module 110 with a set of active data object identifiers 112, which can be a data-centric data structure maintaining active data object metadata. For one exemplary illustration, FIG. 4 illustrates some exemplary data structures 400 that can be utilized by a DPM according to some embodiments, including an exemplary table depicting metadata of a set of active data object identifiers 112 in an embodiment. As illustrated, the active data object identifiers 112 includes multiple entries 404, where each entry corresponds to one data object. In this example, each entry 404 comprises a data object identifier—here, a file system path of a file, which may or may not be the same as the immutable identifier from the corresponding data object access request. Thus, the ability to map (e.g., using a direct lookup or some other technique) an immutable identifier to an entry 404 of the active data object identifiers 112 results in that data object being deemed an active data object.

In some embodiments, the active data object identifiers 112 further includes other metadata values 402, represented as columns 2-8: a user identifier of a user that created the data object (CREATOR ID), a department within the organization of the user that created the data object (CREATOR DEPT.), a date and/or time of the data object's creation (CREATION TIME), a date and/or time of the last access made to the data object by any user (LAST ACCESS), a total number of accesses to the data object by users (TOT. ACC.), a number of accesses to the data object that have occurred in the current period of time (PD. ACC.), a number of different users that have accessed the data object (NUM. DIFF. USERS), etc. In some embodiments, these optional metadata values 402 can be tracked by the DPM 106 (e.g., retrieved periodically and cached or retrieved on-demand from data object servers 108, and or self-populated based upon access request data) and potentially utilized as criteria in, for example, determining a cost to access a data object. Additionally, in some embodiments, one or more of these metadata values 402 can be used for determining when to transition a data object from "active" to "inactive", which will be described later herein with regard to FIG. 12.

Turning back to FIG. 3, the DPM 106 is further illustrated as including a PAPM 102 with an optional per-user active data object budget 302. In contrast to the set of active data object identifiers 112, the per-user active data object budget 302 can be a user-centric data structure. Turning back to FIG. 4, an exemplary per-user active data object budget 302 is illustrated as including multiple entries 406 that each include a user identifier (USER ID) such as a user name or unique user number, for example. In some embodiments, each per-user active data object budget 302 can include one or more optional metadata values including, but not limited to, a current amount of budget for accessing active data objects (CURRENT BUDGET), an allocated budget for a current time period (ALLOCATED BUDGET), a date and/or time of the end of the time period (BUDGET EXPIRATION), and/or a set of zero or more data objects that have been accessed by that particular user during the current time period (PD-ACCESSED DATA OBJ.).

In this illustration, the budget-related values (CURRENT BUDGET, ALLOCATED BUDGET, BUDGET EXPIRATION) are illustrated once. However, in some embodiments, there can be additional sets of one or more of these attributes and values corresponding to additional time periods that are being tracked concurrently. Alternately or additionally, in some embodiments, there can be additional sets of one or more of these attributes and values specific to particular data object servers 108. For example, in some embodiments where a DPM 106 serves multiple data object servers 108, the per-user active data object budget 302 can include different budgetary amounts for a user for different servers, which may or may not be different types of servers (e.g., two sets of budget values could exist for two different data object servers).

In some embodiments, the PD-ACCESSED DATA OBJ. value can be tracked in this data structure to allow for determining a cost to access the data object. For example, in some embodiments where a user accesses a particular data object multiple times, the user may be charged a smaller amount (e.g., zero) for those subsequent accesses to a same data object within a time period. One way to accommodate this determination includes tracking and utilizing the set of the user's accessed data objects to see if a user has accessed a particular data object.

Turning back to FIG. 3, the PAPM 102 is illustrated as optionally communicating with an access log 308 including a user access history 310, which can be periodically populated by the PAPM 102, or from which the PAPM 102 can determine whether a user has accessed a particular data object previously (in the case where this data is not tracked locally as the PD-ACCESSED DATA OBJ., for example). The PAPM 102 is also illustrated as optionally communicating with a directory service 312, which similarly can be utilized in some embodiments during access cost calculations to determine the particular users, user groups, etc., that are associated with a requested data object (e.g., who is the creator, data owner, department of the data object creator, etc.)

The HPM 104 is also illustrated in FIG. 3 as including an inactive data object user-activity record 304 and optionally, a set of one or more encryption key(s) 306.

The inactive data object user-activity record 304 is a user-centric data structure and is illustrated in FIG. 4 as including entries 408 for users, where each entry includes a user identifier (USER ID) such as a user name or unique user number, for example. The inactive data object user-activity record 304 can also include one or more metadata values including, but not limited to, a grace amount (GRACE AMT), an amount of a temporal allocation that is remaining (TEMP. ALLOCATION REMAINING), an amount of temporal allocation granted to the user (TEMP. ALLOCATION AMT.), and a date and/or time that the temporal allocation expires (TEMP. ALLOCATION EXPIRATION).

As described earlier, the HPM 104 can implement comparatively "heightened" protections for inactive data objects. As one example, the HPM 104 can implement a temporal allocation protection scheme allowing users to access only a limited number of inactive data objects in a period of time before the user is blocked from further access.

For example, in some embodiments users can initially be granted a "grace amount" of accesses to inactive data objects in a time period. As illustrated in FIG. 4, the first user 'A' has a current grace amount of "3", meaning that the user can access three more inactive data objects during a time period before being blocked or required to seek additional access capability. In this example, it is possible that each of the users in the system are allocated a custom grace amount (e.g., users can get different grace amounts), a same grace amount (e.g., each user gets "5" accesses), or no grace amount whatsoever.

In some embodiments utilizing grace amounts, upon the expiry of the grace amount the user can be blocked from further inactive data object access by the DPM 106, which can include not passing received access requests for inactive data objects onto the corresponding data object servers 108 and/or transmitting alerts, for example. In some embodiments, upon being blocked due to a total consumption of a grace amount, the user can also be prompted to contact a manager or supervisor for a temporal allocation that would provide the user a limited time to access a limited number of inactive data objects. Alternatively or additionally, upon the total consumption of a grace amount, the DPM 106 can send such a temporal allocation request message on behalf of the user automatically. Temporal allocation requests can be sent using a variety of technologies known to those of skill in the art, including but not limited to the use of email messages, Short Message Service (SMS)/text messages, Internet Relay Chat (IRC) messages, Inter Process Communication (IPC) techniques, etc. Similarly, temporal allocation responses can be transmitted by similar technologies, and can specify a temporal allocation amount and/or associated duration for the temporal allocation.

Upon an approval of a request for temporal allocation, the DPM 106 can assign a temporal allocation number of data objects (e.g., TEMP. ALLOCATION AMT.) for the user for a time period (e.g., indicated by the TEMP. ALLOCATION EXPIRATION). As illustrated in FIG. 4, user 'B' has already consumed the grace amount and has previously received a temporal allocation (e.g., from a manager, supervisor, security administrator, etc.) allowing the user to access 30 additional inactive data objects until "2015-09-24 18:00:00 PT". At this point, user 'B' has 12 accesses remaining in the temporal allocation, and thus has already accessed 18 inactive data objects allowed under by the temporal allocation.

In some embodiments, no grace amounts are allocated and instead, upon a first access request for an inactive data object during a time period, a temporal allocation must be sought to allow any accesses to such inactive data objects. Similarly, in some embodiments, only grace amounts are allocated and no temporal allocations are utilized.

Additionally, in some embodiments the HPM 104 can also employ another data object protection mechanism involving encryption, and may store one or more encryption keys 306 for this purpose. For example, in some embodiments, the HPM 104 can encrypt and decrypt data objects 114 stored by the data object server(s) 108 as the data objects 114 pass between the client end stations 120 and the data object server(s) 108. In some embodiments, one encryption key 306 (or pair of keys) can be used to encrypt/decrypt only one data object, but in other embodiments, one encryption key 306 (or pair of keys) can be used to encrypt/decrypt more than one data object (e.g., a collection of similar data objects, all data objects of a particular data object server, all data objects of multiple data object servers, etc.)

In some embodiments, neither the client end stations 120 nor the data object server(s) 108 need to be aware of this DPM-controlled encryption, and this configuration can further secure the data objects 114 stored at the data object server(s) 108 from large-scale data breaches because, in order for a user and/or client end station to gain access to the true unencrypted version of the data objects, the data object access requests must necessarily flow through the proper channel via the DPM 106 (specifically, the HPM 104) to be decrypted. Accordingly, this configuration can prevent large-scale data breaches by eliminating the possibility for the data objects 114 to be accessed from separate channels (e.g., a direct physical or virtual access to a server end station hosting a data object) apart from the protections provided by the HPM 104.

Additionally, this DPM-encryption can remain completely independent from any encryption utilized by the client end stations 120 and/or data object server(s) 108 and thus, the data object can potentially be encrypted by multiple entities (e.g., both the DPM 106 and the data object server(s) 108), potentially without the knowledge of any of the other entities. Further detail regarding these encryption mechanisms will be discussed later herein with regard to subsequent figures.

Figure 5:
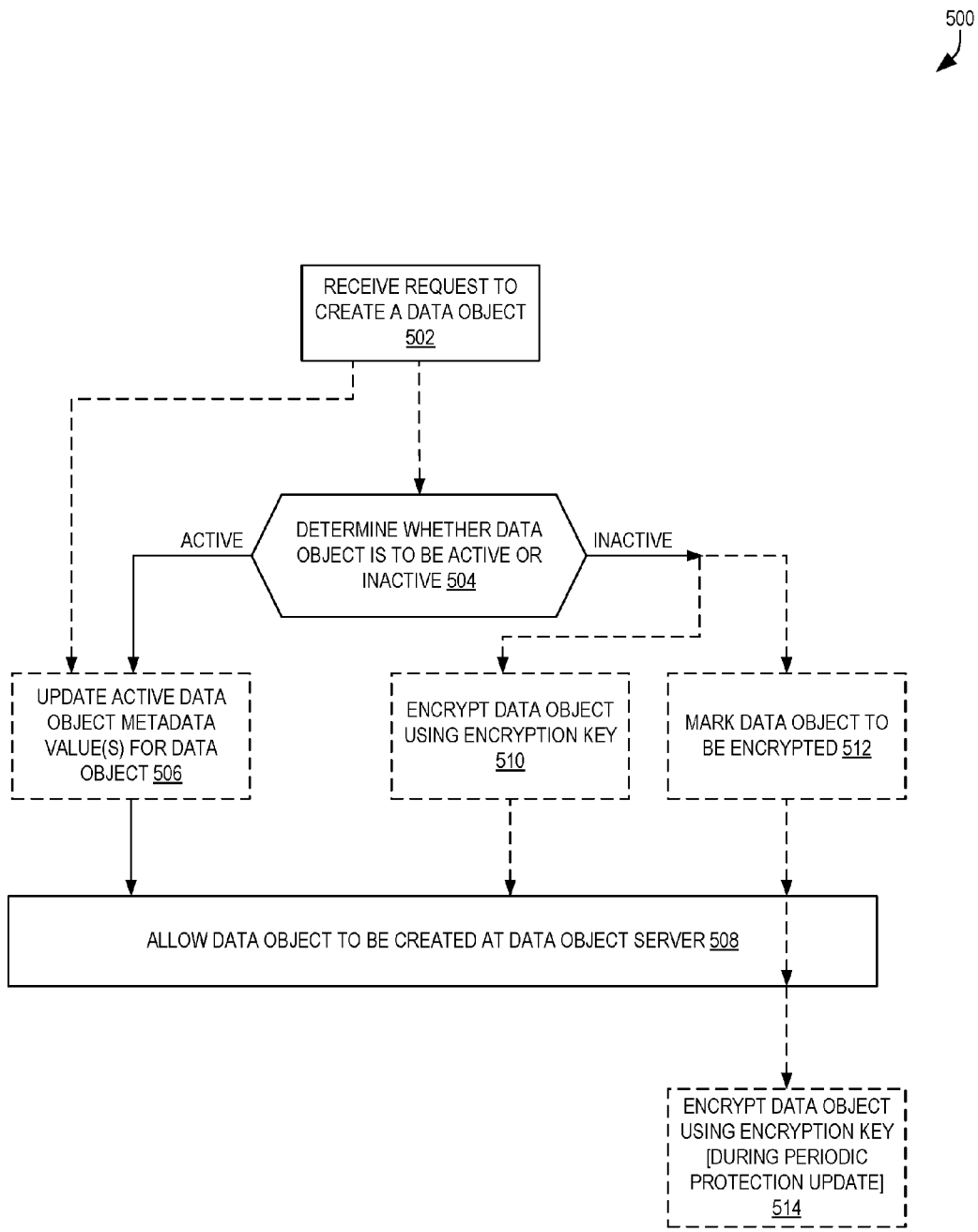
FIG. 5 is a flow diagram illustrating data breach prevention operations for managing data object creation occurrences according to some embodiments.

FIG. 5 is a flow diagram illustrating data breach prevention operations of a flow 500 for managing data object creation occurrences according to some embodiments. In some embodiments, the flow 500 can be performed by the DPM 106. Notably, however, the operations in this and other flow diagrams will be described with reference to the exemplary embodiments of the other figures. However, it should be understood that the operations of the flow diagrams can be performed by embodiments other than those discussed with reference to the other figures, and the embodiments discussed with reference to these other figures can perform operations different than those discussed with reference to the flow diagrams.

The flow 500 includes, at block 502, receiving a request to create a data object. The request can include one or more distinct messages, and can be, for example, a particular HTTP POST request or a combination of CIFS or SMB requests.

In some embodiments the flow 500 can optionally continue to block 506, where active data object metadata values can be updated for the data object. This path may occur in some embodiments utilizing differentiated protection layers where, for example, all new data objects are initially to be classified as being active, and only moved to being classified as inactive at a later time subject to certain conditions being met. The flow can then continue to block 508, where the data object is allowed to be created at the data object server.

In other embodiments (e.g., some embodiments utilizing differentiated protection layers), after block 502 the flow 500 may continue with block 504 where a determination is made as to whether the data object is to be initially classified as active or inactive. This determination can be made using a set of rules defining criteria and logic for classifying the data object as active or inactive. For example, a rule can be configured such that certain new data objects with a particular file extension are to be made inactive, or that all other new data objects with a different file extension are to be made active. Of course, many other rules can be flexibly configured based upon the specifics of the particular environment/deployment scenario.

When the determination of block 504 indicates that the new data object is to be initially classified as active, flow optionally continues to block 506, where active data object metadata values can be updated for the data object. For example, this can include inserting a new entry for the data object in the set of active data object identifiers 112 of the PLDM 110. However, in some embodiments (e.g., some embodiments not utilizing differentiated protection layers) block 506 is not utilized as there may be no need for distinguishing between active vs. inactive data objects.

Either way, the flow 500 continues to block 508 and allowing the data object to be created at the data object server(s) 108. This block 508 can include transmitting the received request (e.g., from block 502) on to the data object server(s) 108 to be created. However, when the determination of block 504 results in a finding that the new data object is to be inactive, the flow 500 can continue in two directions.

In one case, flow continues to block 510, where the data object is encrypted using an encryption key (e.g., encryption key(s) 306 of FIG. 3). The encryption key(s) 306 can be used only for that data object and thus, can be associated at the DPM 106 with an identifier of the data object (e.g., within a non-illustrated data structure), thus allowing the particular encryption key(s) 306 to be found again when a decryption is required. Additionally, a "shared" encryption key 306 that is used for multiple data objects can also be utilized for the encryption. Flow then continues to block 508, where the DPM-encrypted version of the data object is created at the data object server (e.g., by transmitting the DPM-encrypted version on to the data object server instead of the client end station provided version of the data object).

In the other case, flow can continue to block 512, where the data object is "marked" as needing to be encrypted. This can include maintaining a data structure of data object identifiers that represent data objects needing to ultimately be encrypted by the DPM 106. Accordingly, flow can continue to block 508, where the original (non-DPM-encrypted, though potentially client-encrypted) version of the data object (e.g., received at or subsequent to block 502) is passed on to the data object server(s) 108 to be created. Subsequently, the flow can continue at block 514, where the data object is eventually encrypted using an encryption key. Block 514 can occur during a periodic protection update performed by the DPM 106, where any data objects marked as needing to be encrypted may be retrieved by the DPM 106 from the corresponding data object server, encrypted using an encryption key, and sent back in DPM-encrypted form to the corresponding data object server to be stored. Of course, the data object server(s) 108 may store the data object in the DPM-encrypted form or may even encrypt this DPM-encrypted form once again using its own encryption mechanism.

Figure 6:
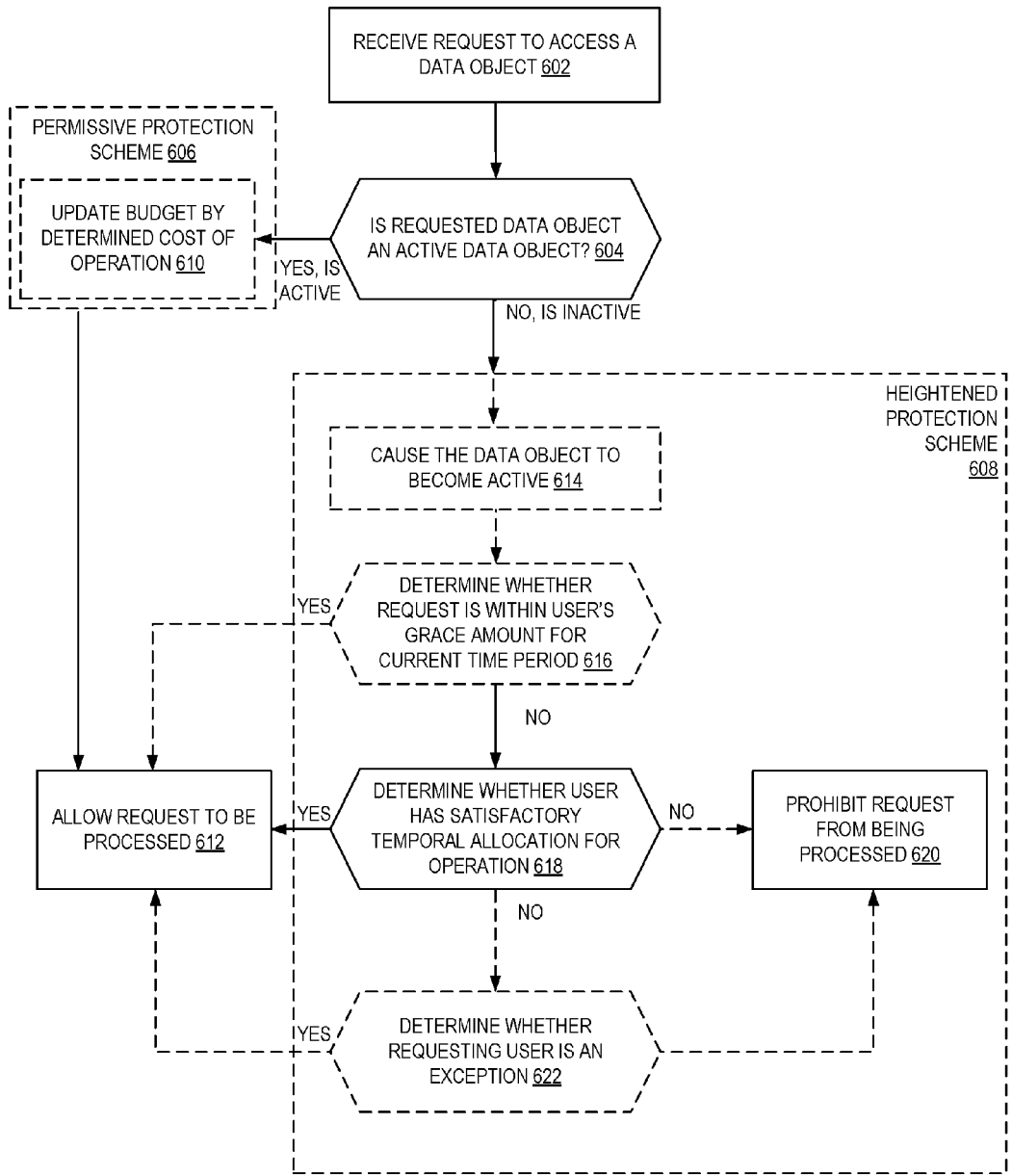
FIG. 6 is a flow diagram illustrating high-level operations for managing data object access requests according to some embodiments.

With regard to accessing data objects, FIG. 6 is a flow diagram illustrating a flow 600 including high-level operations for managing data object access requests according to some embodiments. In some embodiments, this flow involves requests to "read" or "retrieve" a data object, but in other embodiments an access request can be a request to perform another type of operation. In some embodiments, some or all the operations of flow 600 can be performed by the DPM 106 described herein.

In an embodiment, the flow 600 begins at block 602 and receiving a request to access a data object, which may include an immutable identifier (e.g., a relative or absolute path of a file, some or all of a URI or URL, an alphanumeric string serving as a unique identifier in some context, etc.) of the data object. At block 604, a determination is made as to whether the requested data object is currently classified as an active data object. Block 604 can include, for example, performing a lookup (using some or all of the immutable identifier as a key) into a data structure representing the set of active data object identifiers 112 of the PLDM 110 to determine whether an entry exists for the data object.

When the data object is an active data object (e.g., when an entry exists in the set of active data object identifiers 112), flow can optionally continue to block 610 to update the requesting user's budget(s) corresponding to the current time period(s) based upon a determined cost of the operation. Accordingly, block 610 may occur as part of a permissive protection scheme 606 (e.g., by a PAPM 102) in embodiments utilizing differentiated protection layers. Next, flow can continue to block 612, where the request is allowed to be further processed, either by additional but different security-related processing modules (e.g., of a security gateway) or by sending the access request on to the corresponding data object server(s) 108.

However, when block 604 results in a determination that the data object is currently classified as being inactive, flow can continue on optionally into a heightened protection scheme 608 (e.g., implemented by the HPM 104).

In some embodiments, this can include block 614 and causing the data object to become active. This can occur, for example, subject to particular conditions being met (e.g., determining whether the currently-inactive data object has been accessed a threshold number of times by a threshold number of different users). As another example, in some embodiments, if the request to access the data object (received at block 602) is a request to write to the data object, the system may be configured to cause the data object to become classified as active, and thus subsequent requests to access the data object may be handled under the permissive protection scheme 606 instead of the heightened protection scheme 608. However, block 614 may not be performed in many embodiments. For example, in some embodiments, once a data object becomes classified as inactive it can never move to becoming classified as active again. Additionally, in some embodiments, a data object will not be reclassified from inactive to active directly responsive to a particular request to access the inactive data object, but may occur subject to a periodic classification update or a request from a user (e.g., a security administrator or data owner).

Optionally, flow continues to block 616, where a determination can be made as to whether the request is within the requesting user's grace amount for the current time period.

Of course, in embodiments not implementing grace amounts for inactive data object accesses, this block 616 may not be performed. However, when block 616 is performed and there is a sufficient grace amount for the access, the flow may continue to block 612, where the request is allowed to be processed. If, instead, the use of grace amounts is enabled but there is not a sufficient grace amount left for the current time period for the requesting user, flow may continue on to block 618.

At block 618, a determination can optionally be made to determine whether the requesting user currently has a satisfactory temporal allocation to allow the access operation to be performed. Of course, in embodiments not utilizing temporal allocations, block 618 may not be performed. However, when block 618 is performed and satisfactory temporal allocation does exist, the temporal allocation may be adjusted based upon this operation (e.g., the non-illustrated decrementing of a TEMP. ALLOCATION REMAINING value of inactive data object user-activity record 304 of FIG. 4) and flow can continue to block 612, where the request is allowed to be processed.

When block 618 is performed yet not enough temporal allocation exists for the user, flow may continue to block 620, where the access request is prohibited from being processed by the data object server(s) 108. This can include simply dropping the access request (i.e., not sending it to the corresponding data object server(s) 108) and/or logging this "dropping" and/or notifying one or more other entities (e.g., users, logging facilities, etc.).

Instead of moving straight to block 620 from block 618, some embodiments may be configured to instead first flow to decision block 622, where a determination is made as to whether or not the requesting user is part of an excepted class of users (i.e., is an "exception" to the temporal allocation scheme). For example, in some embodiments certain users of an enterprise can be configured to be exceptions to these protections, such as high-level employees (e.g., a president, Chief Executive Officer (CEO), Chief Information Officer (CIO), Chief Technology Officer (CTO), etc.) or a system maintenance user (e.g., a network administrator or engineer), for example. If the user is deemed an exception at block 622, the flow may continue to block 612 where the request is allowed to be processed, but otherwise the flow may continue back to block 620 where the request is prohibited from being processed.

Additionally, in some embodiments utilizing user exceptions (see block 622), some or all of these users can be subject to further protections on the part of the heightened protection scheme 608. For example, in some embodiments system maintenance users can be allowed to access data objects but the system may not decrypt any DPM-encrypted inactive data objects. This configuration can protect against sensitive data from being leaked to these users while, for example, allowing these users to perform tasks such as moving data objects from one storage location to another, which does not require that the user actually be able to example the "true" version (i.e., the non-DPM-encrypted version) of the data object.

Figure 7:
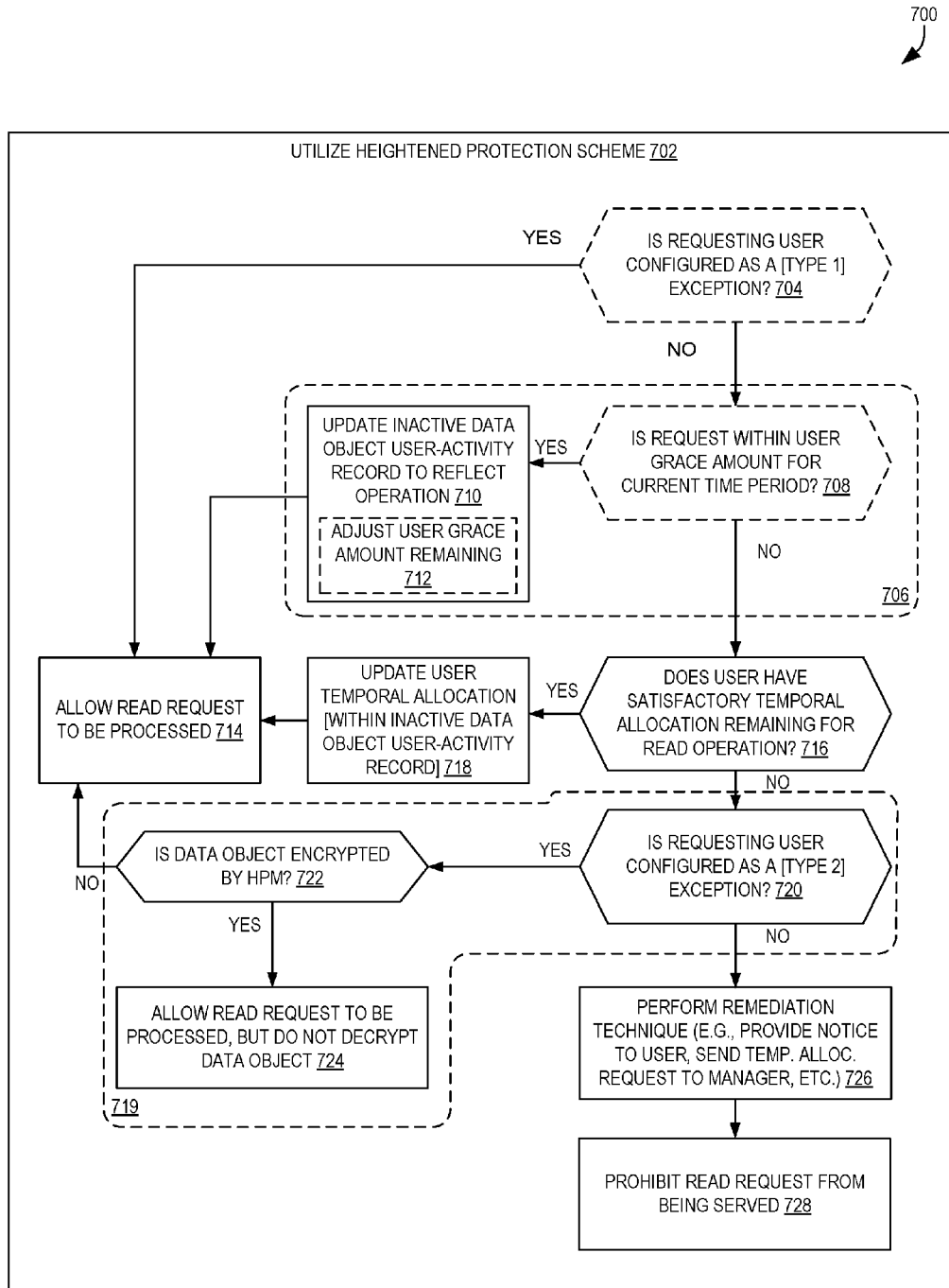
FIG. 7 is a flow diagram illustrating operations for utilizing a heightened protection scheme for managing data object read requests according to some embodiments.

For additional detail of one particular exemplary implementation of a heightened protection scheme, we continue to FIG. 7, which is a flow diagram illustrating a flow 700 for utilizing a heightened protection scheme 702 for managing data object read requests according to some embodiments. The flow 700 can optionally include block 704, where a determination is made as to whether the requesting user is configured as an exception. In embodiments with different types of exceptions, block 704 can include determining whether the user is a "type 1" exception, meaning that the user is allowed full access to non-DPM-encrypted data objects (e.g., can act as somewhat of a "super user"). If the user is determined to be allowed full access to these data objects, the flow can continue to block 714, where the read request is allowed to be processed.

Otherwise, flow may continue to a set of region 706 protections (in some embodiments implementing grace amounts) and decision block 708, where it is determined whether the request falls within a grace amount of the user for the current time period. If so, flow can continue to block 710, where the inactive data object user-activity record 304 (of the HPM 104) can be updated to reflect the operation. Block 710 can comprise block 712 and adjusting the amount of the user's grace amount remaining. This path of the flow can also include proceeding to block 714 to allow the request to be processed.

If the result of decision block 708 is "no" (or in embodiments not utilizing grace amount protections of region 706), flow can continue to block 716, where a determination is made as to whether the user has satisfactory temporal allocation remaining for the operation. If so, flow can continue to block 718, where the user's temporal allocation remaining can be updated based upon this request (e.g., decremented), which could be within the inactive data object user-activity record 304. Additionally, the read request can be allowed to be processed at block 714.

However, if satisfactory temporal allocation is determined at block 716 to not exist, flow can continue with region 719 protections (e.g., in some embodiments utilizing exception users with limited read access capabilities) and block 720, which is a decision block for determining whether the user is configured as a second type of exception. As indicated above, in some embodiments users can be configured as a second type of exception allowing the user to perform certain access operations upon inactive data objects though not be provided access to the "original" non-DPM-encrypted versions of these data objects. If the requesting user is determined to be an exception of this second type, the flow can continue to block 722, where it is determined whether the requested data object has been encrypted by the HPM 104. If so, flow continues to block 714 where the read request will be allowed to be processed normally, but if not, flow continues to block 724, where the read request will be processed but the returned data object will not be decrypted by the HPM 104. Accordingly, the client end station of the requesting user will only receive back the HPM-encrypted version of the data object, which is effectively not recoverable by that user due to their lack of access to a decryption key.

In embodiments not utilizing the region 719 protections and where block 716 results in a "no" determination, or in embodiments where the block 720 determination results in a "no," the flow can continue to block 726, where a remediation technique can be performed, which can include performing one or more actions, such as providing a notice to the requesting user (e.g., via a message sent to the user's client end station) that the request could be processed, sending a temporal allocation request to a manger/supervisor of the user, etc. Additionally, at block 728, the request is prohibited from being processed/served, which can include dropping (i.e., not transmitted to the corresponding data object server(s) 108) the access request.

Figure 8:
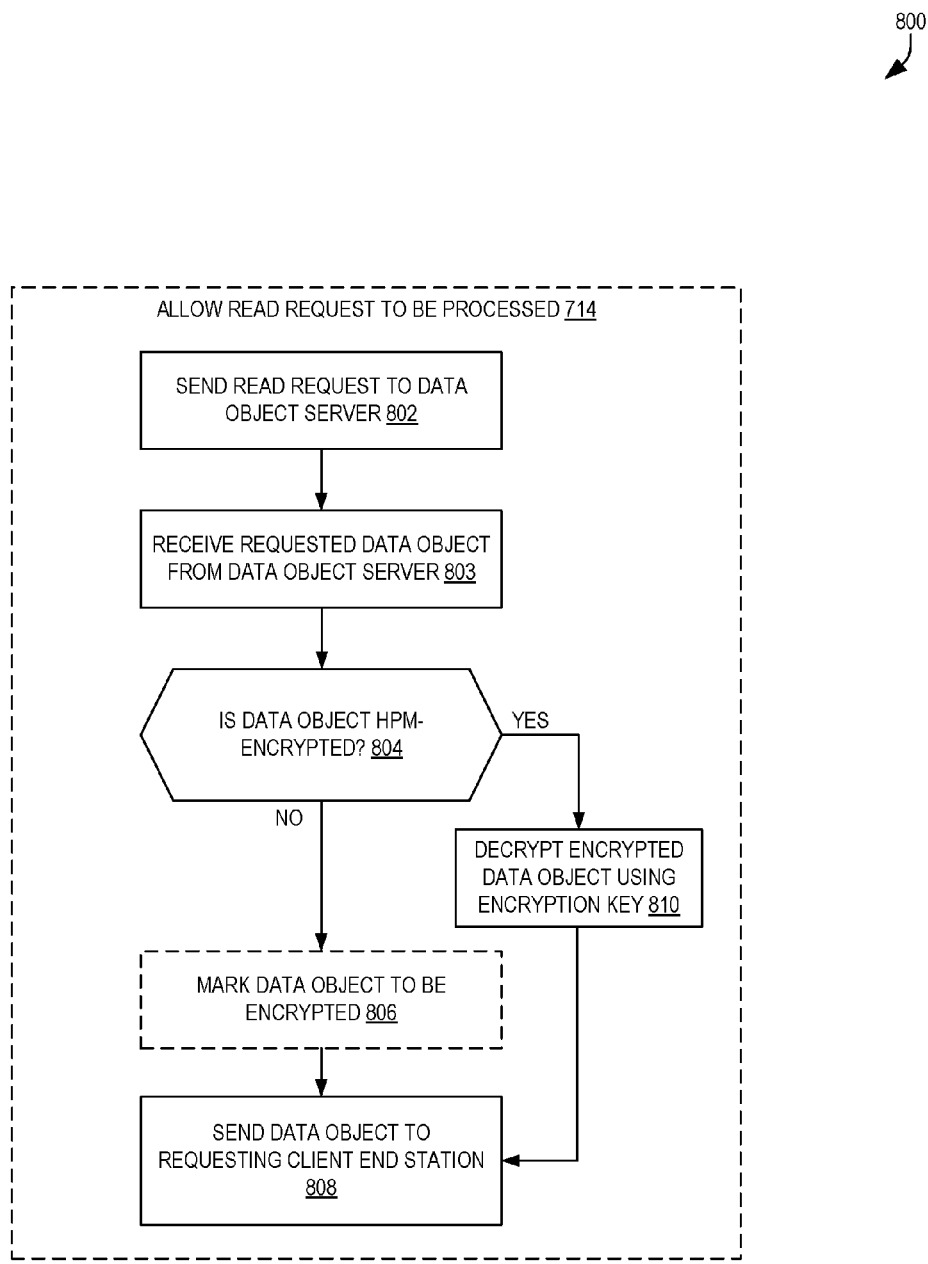
FIG. 8 is a flow diagram illustrating operations for allowing read requests to be processed under the heightened protection scheme of FIG. 7 according to some embodiments.

Although some details regarding what it means to allow a read request to be processed in block 714 have been provided above, for a more detailed exemplary description we turn to FIG. 8, which is a flow diagram illustrating operations 800 for allowing read requests to be processed under the heightened protection scheme of FIG. 7 according to some embodiments. In some embodiments, block 714 includes transmitting/sending the access (e.g., "read") request on to the corresponding destination data object server(s) 108 at block 802. At block 803, the flow can include receiving the requested data object from the data object server(s) 108 that are responsible for storing and/or serving that data object.

At decision block 804, a determination can be made as to whether this data object has been HPM-encrypted. This can include, for example, examining the returning data object to determine whether a "flag" or "signature" exists within the data object (e.g., within a header of a file) that was placed there by the HPM when it performed the encryption. As another example, block 804 can include performing a lookup into a data structure that tracks which of the inactive data objects have been HPM-encrypted.

If the data object has not been HPM-encrypted, the flow can optionally include marking the data object to be encrypted (immediately thereafter, at a later time, later during a bulk update process, etc.) at block 806, and the "original" (or non-HPM-encrypted) data object can be sent back to the requesting client end station at block 808.

However, if the data object has been determined to be HPM-encrypted at block 804, flow can continue to block 810, where the HPM-encrypted data object can be decrypted using an encryption key 306, and then the decrypted "original" data object can be sent back to the requesting client end station at block 808.

Again, it is expressly contemplated that the "original" data object (e.g., an HPM-decrypted data object or a data object that has not been encrypted by the HPM) can possibly have been previously encrypted by the client end station or by another device on the user's behalf. Further, it is possible that the data object server 108 itself could have encrypted the data object—regardless of whether it is in its "original" form (from the perspective of the user) or in an HPM-encrypted form—to, for example, keep the data encrypted at rest. Accordingly, many different entities can potentially encrypt and decrypt the involved data objects, and the embodiments disclosed herein can flexibly accommodate these scenarios.

Figure 9:
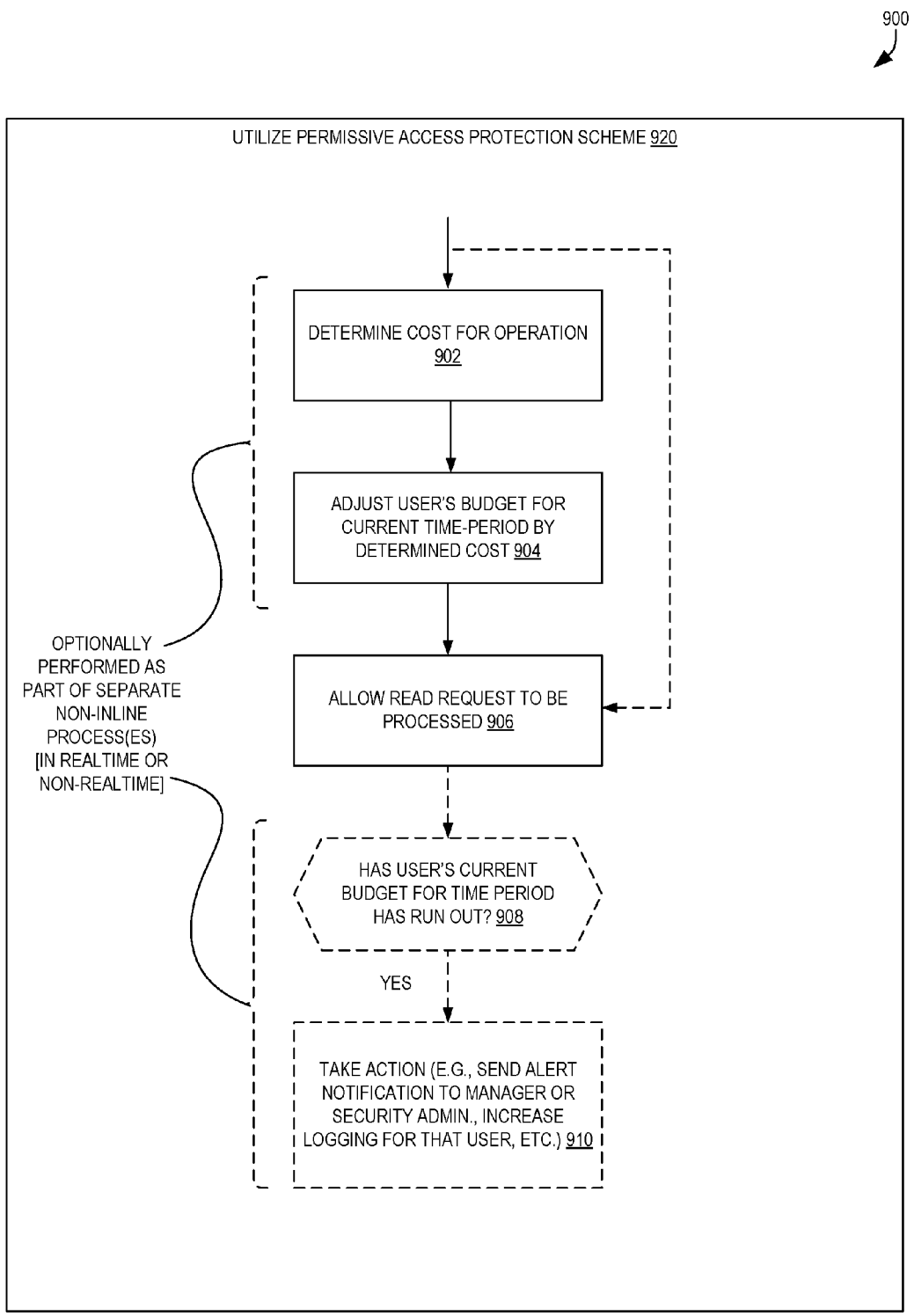
FIG. 9 is a flow diagram illustrating operations for utilizing a permissive access protection scheme for managing data object read requests according to some embodiments.

Having provided further exemplary detail regarding the utilizing of a heightened protection scheme 608/702 in FIGS. 7-8, we now provide further exemplary detail regarding the use of a permissive protection scheme 606/920 in FIG. 9. FIG. 9 is a flow diagram illustrating a flow 900 for utilizing a permissive access protection scheme 920 for managing data object read requests according to some embodiments.

The depicted flow 900 can, in some embodiments, be initiated from a "YES, IS ACTIVE" determination from decision block 604 of FIG. 6; however, this is merely one possibility. Additionally, the flow 900 can begin at block 902 or block 906, for example, depending upon the particulars of the implementation.

Regardless, the flow 900 can include block 902, where a cost is determined for an access request. Further detail regarding one possible configuration for block 902 will be presented later with regard to FIGS. 10 and 11.

Once an access cost has been determined, the flow can continue at block 904, where the user's budget for one or more current time periods can be adjusted (or "charged") based upon the determined access cost. This block 904 can be similar or equivalent to block 610 shown in FIG. 6. In some embodiments using numeric budgets, each of the user's one or more budgets for current time periods can be decremented by the access cost.

At block 906, the access (e.g., read) request is allowed to be processed. The flow 900 can optionally continue with decision block 908, where a determination is made as to whether the user's current budget for one or more of the current time periods has run out (i.e., has been exhausted or eliminated). If so, flow may continue to optional block 910, where one or more actions may be taken in response. The actions can include one or more of a variety of possible actions, including but not limited to sending an alert notification to a manager of the user or security administrator of the enterprise, increasing an amount of logging and/or scrutiny being placed upon future requests from the user, etc. The actions can also be based upon determining that the user has exhausted their budget for a number of periods (e.g., has exceeded budget in three consecutive time periods), and can possibly instruct the system to deny further accesses from the user.

Notably, the operations of blocks 902, 904, 908, and/or 910 can be performed in substantially real-time along with the access requests, or could be performed by a separate process, for example, that is non-inline and/or non-real-time.

Figure 10:
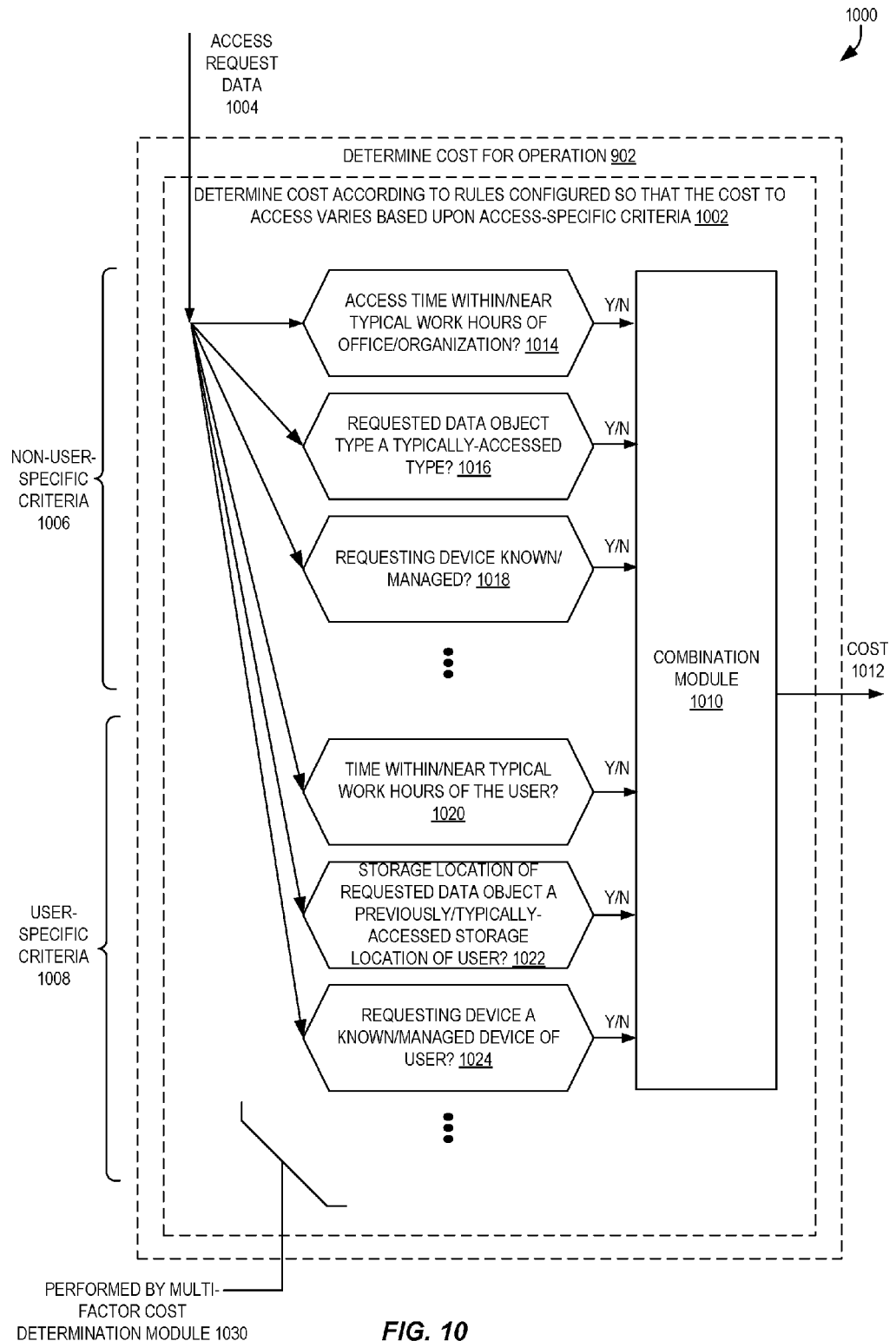
FIG. 10 is a combined block and flow diagram illustrating operations for data object cost determination under the permissive access protection scheme of FIG. 9 according to some embodiments.

For further detail regarding exemplary operations of block 902, we turn to FIG. 10, which is a combined flow and block diagram illustrating operations for data object cost determination under the permissive access protection scheme of FIG. 9 according to some embodiments. In this exemplary depiction, the determining of a cost for an access operation block 902 can include determining the cost according to one or more rules that are configured so that the cost to access a data object varies based upon access-specific criteria, as indicated by block 1002.

For example, using access request data 1004 (e.g., an identifier of the requested data object, an identifier of the requesting user, an identifier of the requesting client end station, a time the request was issued and/or received, etc.) as an input, multiple non-user specific criteria 1006 and/or multiple user-specific criteria 1008 can be used to determine the access cost 1012.

In this example, the non-user specific criteria 1006 include determining whether the access request time is within/near the typical working hours of the organization or office where the user works (block 1014), determining whether the type of the requested data object is a typically-access type (block 1016), determining whether the requesting client end station is known or is a managed device of the enterprise (block 1018), etc.

Similarly, the user-specific criteria 1008 include determining whether the access time is within or near the typical working hours of that particular user (block 1020), determining whether the storage location (e.g., a folder, path, server, etc.) of the requested data object has been previously or typically accessed by that user (block 1022), determining whether the requesting device/client end station is known to be used by the requesting user or is a managed device assigned to that user block 1024), etc.

As illustrated, when any of these decision blocks arrives at a positive determination (e.g., a "YES" result), that result can act as a factor in potentially reducing the determined access cost (when compared to a "NO" result), as positive results indicate more typical actions of typical users in the enterprise. Similarly, when any of these decision blocks arrives at a negative determination (e.g., a "NO" result), that result can act as a factor in potentially increasing the determined access cost (when compared to a "YES" result), as negative results indicate more atypical actions of typical users in the enterprise. As a result, a combination module 1010 can be flexibly configured to utilize one, some, or all of these inputs as factors to determine the access cost 1012.

Figure 11:
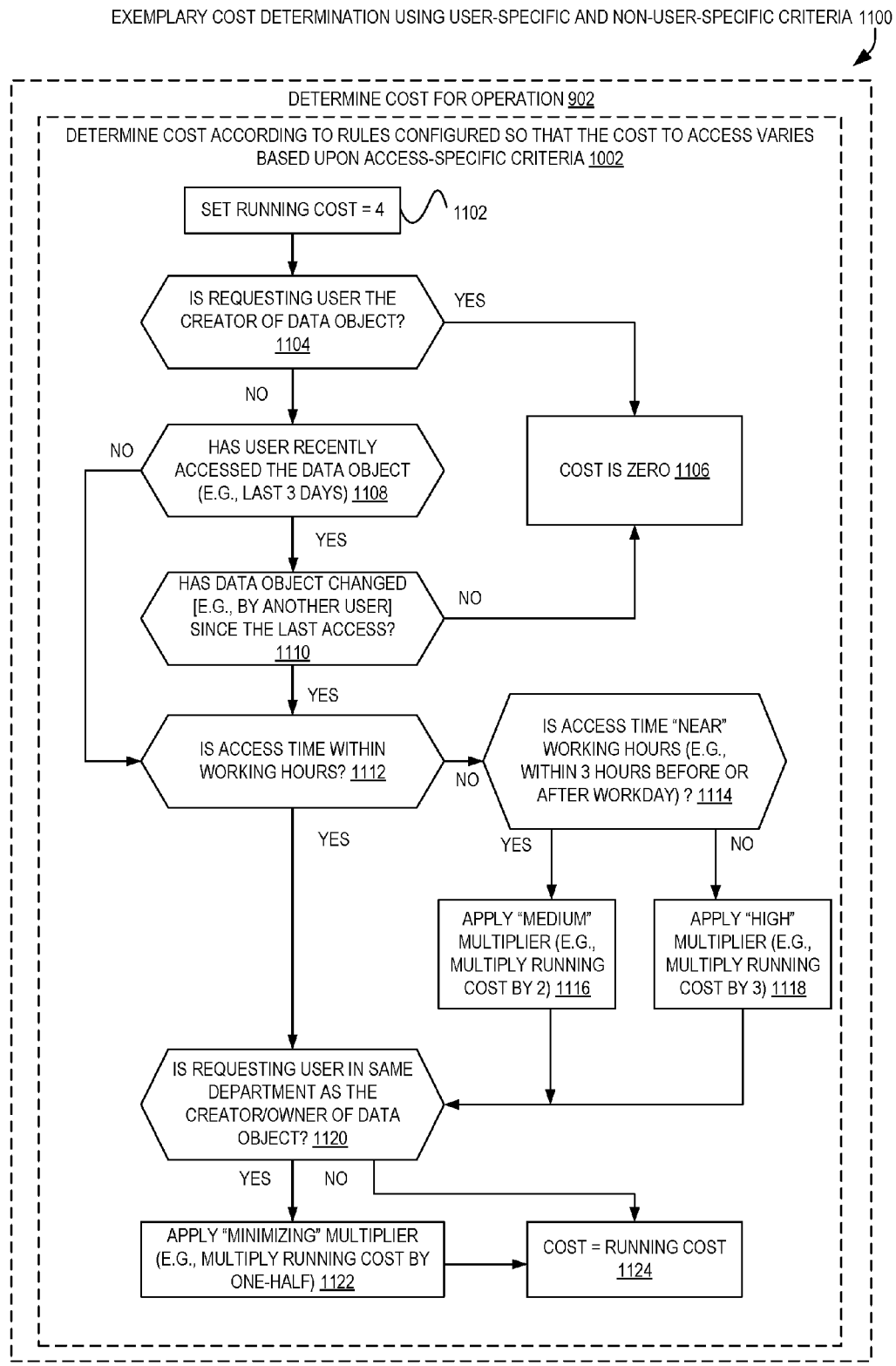
FIG. 11 is a flow diagram illustrating exemplary operations for data object cost determination using both user-specific and non-user-specific criteria under the permissive access protection scheme of FIG. 9 according to some embodiments.

As one specific example, we turn to FIG. 11, which is a flow diagram illustrating exemplary operations 1100 for data object cost determination using both user-specific and non-user-specific criteria under the permissive access protection scheme of FIG. 9 according to some embodiments. In this example, a "running" cost can be set at block 1102 (e.g., to be "4"), and a determination is made at block 1104 as to whether the requesting user is the creator of the requested data object. If so, the flow can proceed to block 1106, and the access cost can be zero and thus not count against the user's budget.

If not, a determination at block 1108 is made as to whether the requesting user has recently (e.g., with a recent threshold amount of time) accessed that data object. If so, another determination can be made at block 1110, where it is determined whether the data object has changed (e.g., been modified by another user or process) since the currently-requesting user last accessed it. If not, again the determined access cost can be set to zero.

However, if the user has not recently accessed the data object, the flow can continue to block 1112, where a determination is made as to whether the time of the requested access is within typical working hours (e.g., of the organization, of the user's particular office out of many of the organization, of the user's typical working hours, etc.).

If not, flow can continue to block 1114 where a determination is made as to whether the access time is "near" the working hours, i.e., whether the access time is within a certain window of time (e.g., three hours) before or after the typical working hours. If so, a "medium" multiplier (e.g., multiply by two) can be applied to the running cost at block 1116, but if not, a "large" multiplier (e.g., a multiply by three) can be applied to the running cost at block 1118.

Next, at block 1120, another determination is made as to whether the requesting user works in a same department/division/group as the creator or owner of the data object. If so, a "minimizing" multiplier (e.g., multiple by one-half) can be applied to the running cost at block 1122 and returned at block 1124, but if not, the running cost is returned as the cost at block 1124.

Accordingly, this illustrated configuration includes exemplary determinations and values that could be used in some embodiments, but of course there are many other combinations of determinations, values, orderings, etc., that could also be used to achieve similar results. Moreover, although these determinations are illustrated as being made in a particular order, this need not be the case—for example, each of the determinations could be made at one point and then the logical conditions of the flow could be analyzed with the pre-determined results.

Figure 12:
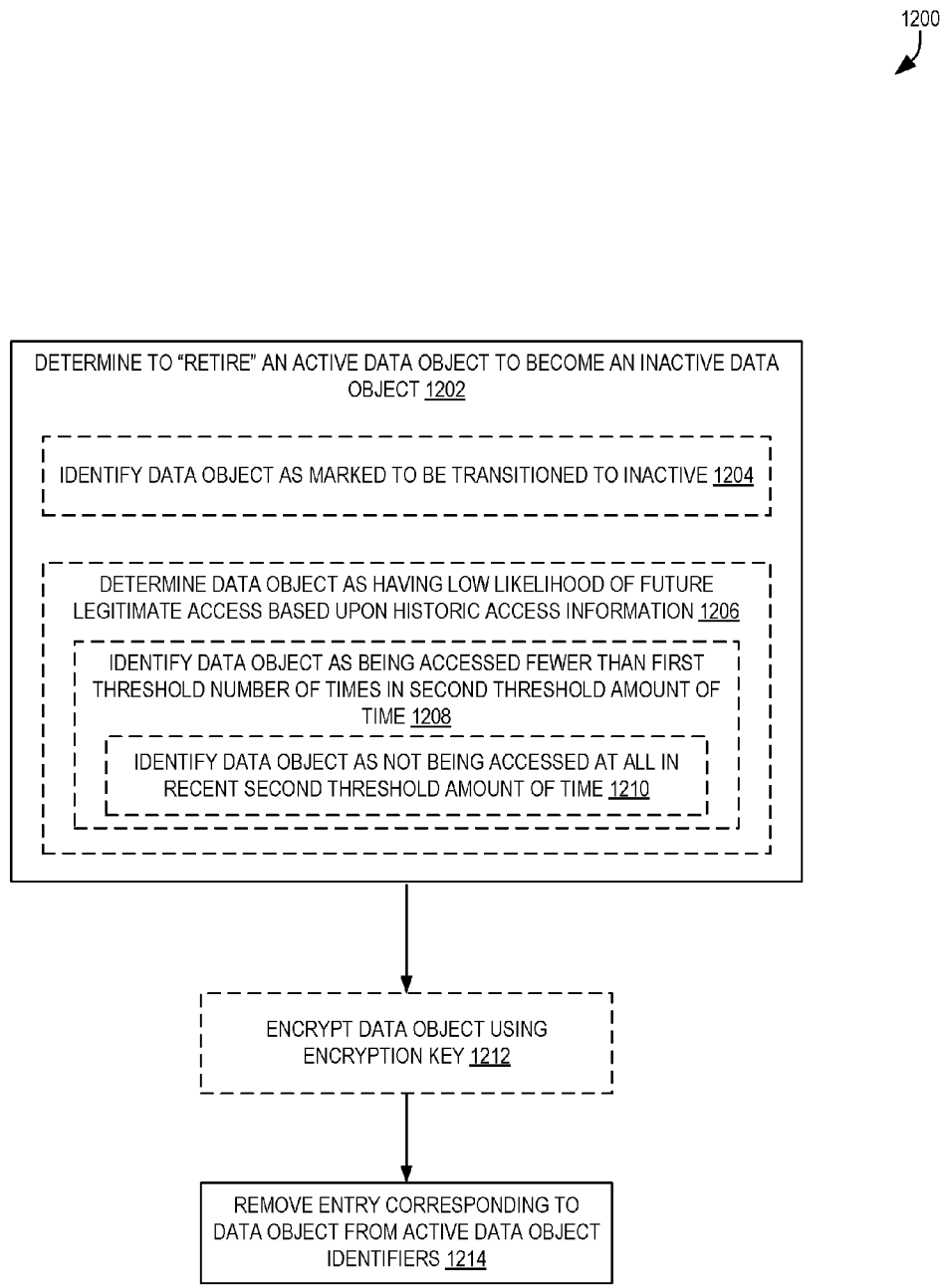
FIG. 12 is a flow diagram illustrating operations for moving a data object from an active state to an inactive state according to some embodiments.

As described earlier, in some embodiments, the system can be configured to move data objects from being classified as active to being classified as inactive; and in some embodiments, the system can be configured to move data objects from being classified as inactive to being classified as active. For example, FIG. 12 is a flow diagram illustrating operations 1200 for the former, in which a data object is moved from an active state to an inactive state. Some embodiments employ such transitions to "retire" active data objects as most data objects of an organization, over time, become unnecessary, obsolete, etc., after they have served their purpose. Accordingly, such embodiments can shift such active objects into the inactive classification to keep the number of active data objects (that are tracked) small so that they can be efficiently tracked (e.g., in the set of active data object identifiers 112 of the PLDM 110).

The operations 1200 include block 1202 and determining to "retire" an active data object to instead be classified as an inactive data object. In some embodiments, block 1202 includes block 1204, where a data object that is marked to be transitioned to inactive is identified. This can include, for example, configurations in which any newly-created data objects are initially marked to be inactive. For example, in some embodiments, one or more rules can be configured to identify particular newly-created data objects that are highly unlikely to ever be legitimately accessed again, and an identifier of such data objects can be marked as needing to be transitioned to the inactive state at some point.

Alternatively or additionally, block 1202 can include block 1206, in which a determination is made that a data object has a low likelihood of further legitimate access based upon historic access information. In some embodiments, block 1202 can include identifying, at block 1208, a data object as having been accessed fewer than a first threshold number of times over a second threshold amount of time. For example, a rule can be configured to detect active data objects that have been accessed by users fewer than two times in the last thirty days, etc. This block 1202 can, in some embodiments, further include block 1210 and thus identifying those data objects that have not been accessed at all in a recent second threshold amount of time (e.g., in the last two weeks, month, etc.). The operations of any of blocks 1206, 1208, and/or 1210 can be performed by analyzing the metadata values from the set of active data object identifiers 112, querying one or more data object server(s) 108, processing one or more data object access logs, etc.

In some embodiments utilizing the encryption techniques disclosed herein, block 1212 can be performed to encrypt the data objects using an encryption key. For example, block 1212 can be performed by the HPM 104 using encryption key(s) 306 by creating and sending a read access request to the data object server(s) 108, receiving the data object, encrypting the data object with one of the encryption keys, and sending a write access request back to the data object server(s) 108 with the encrypted data object.

In some embodiments, the operations 1200 also include block 1214, where an entry corresponding to the data object is removed from the set of active data object identifiers 112. Accordingly, upon any further access requests for the data object, the PLDM 110 will not identify that data object as being "active," and processing may continue with the HPM 104 and/or the heightened protection scheme 608/702.

Exemplary Deployment/Migration Techniques

In addition to the benefits resulting from the effective and efficient techniques disclosed herein for preventing large-scale data breaches utilizing differentiated protection layers and/or unobtrusively protecting against large-scale data breaches utilizing user-specific data object access budgets, some embodiments also can be introduced into existing production systems with little to no disruption to pre-existing access operations. For example, the operations described herein for preventing large-scale data breaches utilizing differentiated protection layers can be implemented into an existing system by slowly learning which of the existing data objects are active and possibly even encrypting the inactive data objects with minimal disruption.

Figure 13:
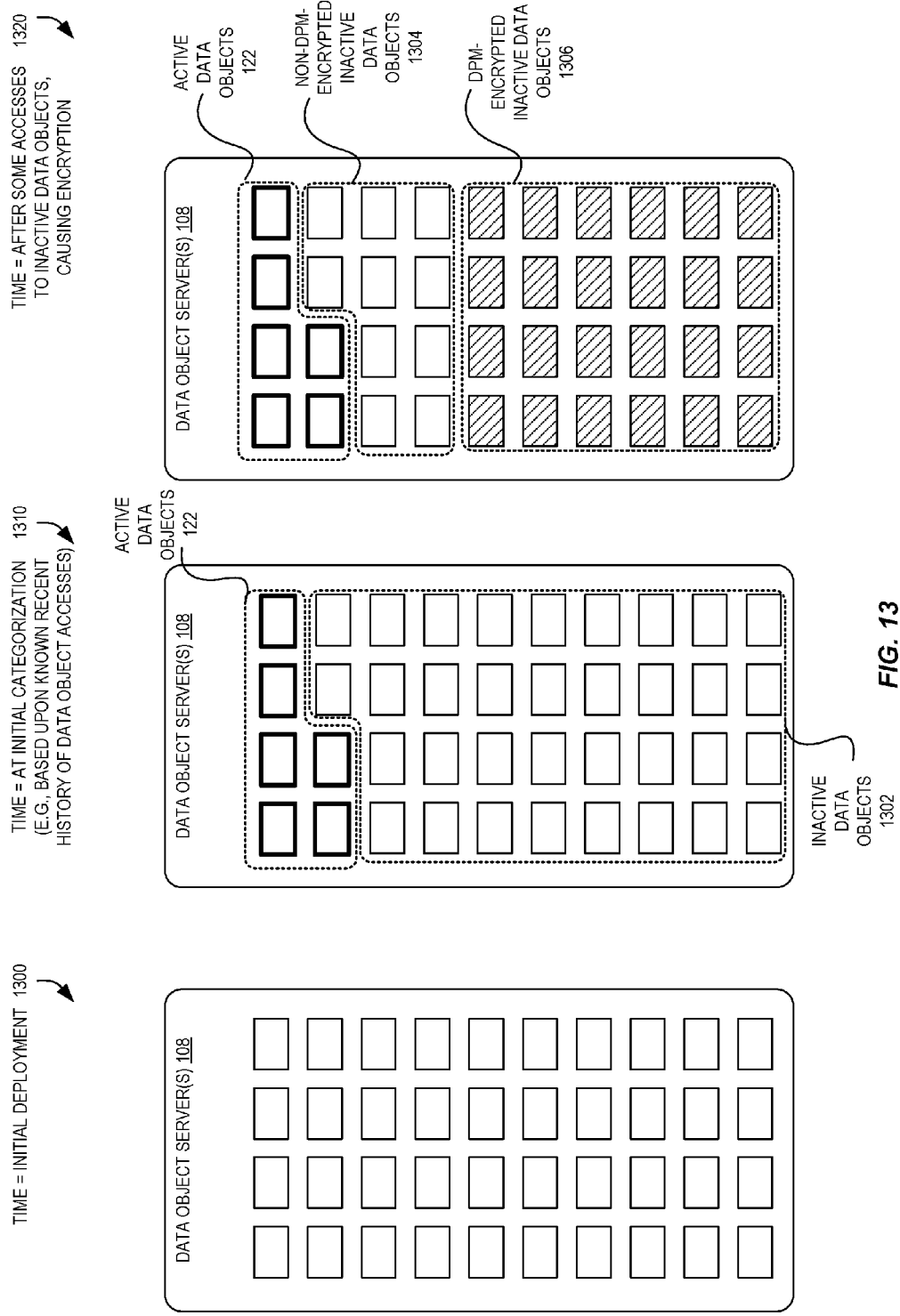
FIG. 13 is a block diagram illustrating an exemplary data object state migration for implementing large-scale data breach protections according to some embodiments.

Accordingly, FIG. 13 is a block diagram illustrating an exemplary data object state migration for implementing large-scale data breach protections according to some embodiments. First, the data object server(s) 108 are illustrated at an initial time of deployment 1300, where there are numerous data objects in existence, although the DPM 106 may not have any knowledge of their status, numbers, locations, etc.

At some point, the system can identify/classify a set of active data objects 122 at time 1310, which can occur in a variety of ways. For example, in some embodiments the system can monitor access requests for a period of time, and any involved data objects corresponding to the access requests during this time can be classified as being active. As another example, in some embodiments the system can analyze an access log of recent requests over a particular time period to identify those data objects that have been recently accessed, and then classify these data objects as being active. As yet another example, in some embodiments the system could query the data object server(s) 108 to identify data objects (e.g., files) that have been accessed in a recent period of time, and classify these data objects as the active data objects. At this point, it is not necessary that the system (e.g., the DPM 106) have any knowledge of the inactive data objects 1302 whatsoever. At this point, the protections afforded by the differentiated protection layers can be fully utilized.

At another point in time 1320 (e.g., after some accesses to inactive data objects), the system can begin to encrypt these inactive data objects (as DPM-encrypted inactive data objects 1306) using the techniques disclosed herein as it learns about the existence of these data objects, though other inactive data objects (non-DPM-encrypted data objects 1304) can continue to remain unencrypted. However, in some embodiments, the non-DPM-encrypted data objects 1304 can transition to becoming DPM-encrypted inactive data objects 1306, such as when access requests arrive for these data objects or based upon the DPM 106 querying another system (e.g., data object server(s) 108) to learn about their existence.

Exemplary Deployment Environments

The components described herein can be deployed in various configurations for various purposes. As one example, FIG. 14 is a block diagram illustrating an exemplary deployment of a security gateway including a DPM 106 according to some embodiments.

Figure 14:
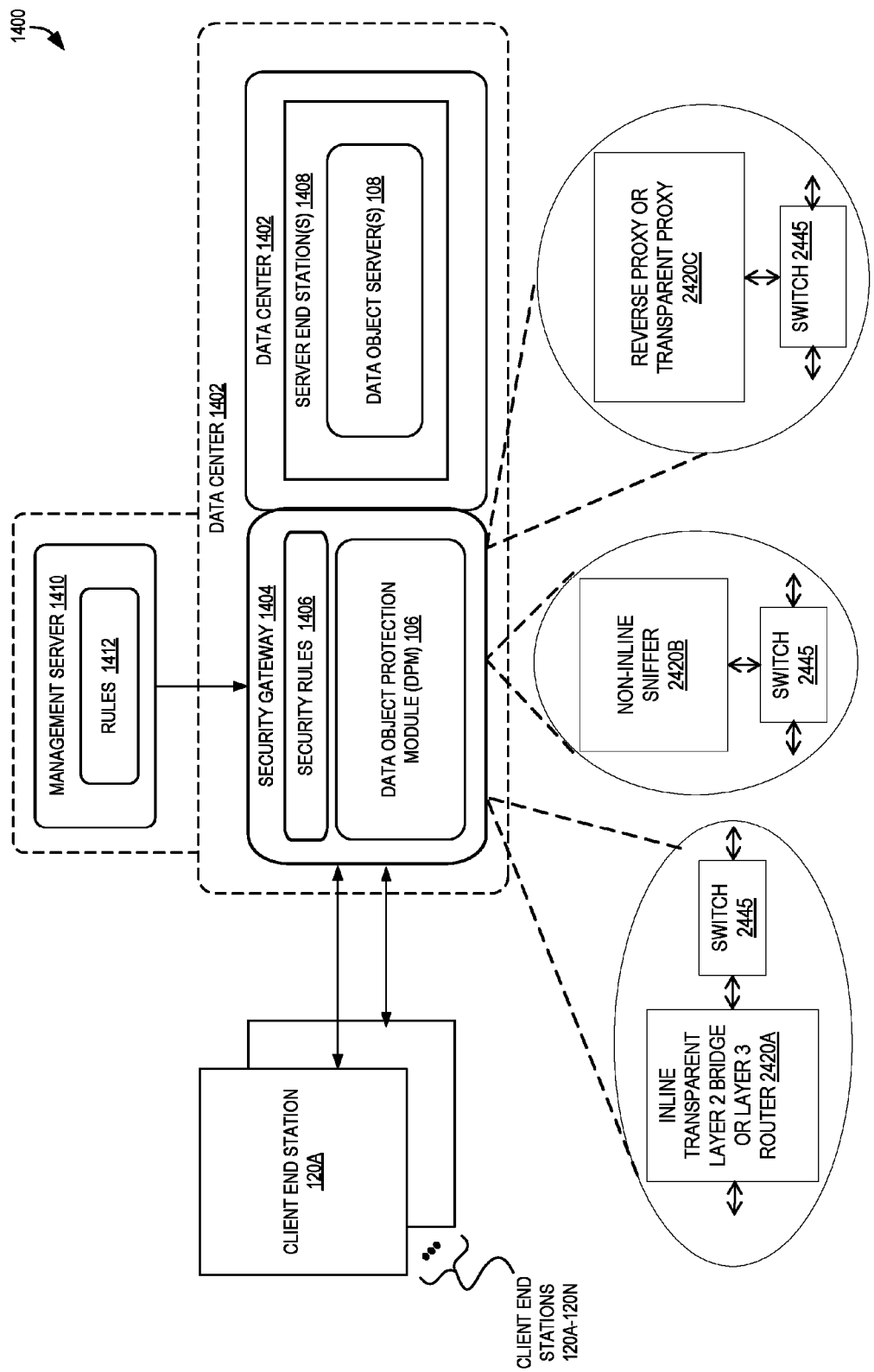
FIG. 14 is a block diagram illustrating an exemplary deployment of a security gateway including a DPM according to some embodiments.

Specifically, FIG. 14 illustrates a security gateway 1404 coupled between a data center 1402 and client end stations 120A-120N. Thus, access to the data center 1402 (and/or data object server(s) 108) can be thought of as being "protected" by the security gateway 1404, as most (or all) desired interactions with the data object server(s) 108 will flow through the security gateway 1404.

In some embodiments, the security gateway 1404 may be "within" the data center 1402, which can further include a management server 1410 providing rules 1412 to the security gateway 1404 for use as security rules 1406. The management server 1410 can also be configured to update, add, or remove security rules 1406 utilized by the security gateway 1404 to perform security-related tasks disclosed herein and/or other tasks such as some of the "determination" operations disclosed herein.

Security gateways 1404—such as firewalls, database firewalls, file system firewalls, and web application firewalls (WAFs)—are network security systems that protect software applications (e.g., data object server(s) 108) executing on electronic devices (e.g., server end stations 1408) within a network by controlling the flow of network traffic passing through the security gateway. By analyzing packets flowing through the security gateway and determining whether those packets should be allowed to continue traveling through the network, the security gateway can prevent malicious traffic from reaching a protected server, modify the malicious traffic, and/or create an alert to trigger another responsive event or notify a user of the detection of the malicious traffic.

In some embodiments, the security gateway 1404 is communicatively coupled between the client end stations 120A-120N and the server end stations 1408, such that all traffic (or a defined subset of traffic) destined to the server end stations 1408 is first passed through (or made available to) the security gateway 1404 for analysis. In some embodiments, part of the analysis is performed by the security gateway 1404 based upon one or more configured security rules 1406.

The security gateway 1404 can be implemented in a variety of ways at a variety of different physical locations. For example, in various embodiments, the security gateway 1404 can be as a transparent inline bridge or router 2420A, non-inline sniffer 2420B, or reverse or transparent proxy 2420C (each of which potentially being communicatively coupled with a switch 2445).

A security gateway deployed as a transparent inline bridge, transparent router, or transparent proxy is placed inline between clients and servers and is "transparent" to both the clients and servers. In such inline transparent deployments, the clients and the servers are not aware of the Internet Protocol (IP) address of the security gateway, and thus the security gateway is not an apparent endpoint. Accordingly, packets sent between the clients and the servers will pass through the security gateway (e.g., arrive at the security gateway, be analyzed by the security gateway, and may be blocked or forwarded on to the server when the packets are deemed acceptable by the security gateway).

In a reverse proxy 2420C deployment, the security gateway 1404 is similarly placed inline between clients and servers, but is not transparent to the clients and servers. Instead, the reverse proxy 2420C serves as an endpoint and thus is typically assigned an IP address (e.g., corresponding to one or more data object servers) that clients can use to access the content/services of the data object server(s), and that the reverse proxy 2420C can use to interact with the data object server(s). Thus, the reverse proxy 2420C will terminate connections from the clients, and also utilize separate connections with the server(s).

Additionally, in some embodiments the security gateway 1404 can also be deployed as a non-inline sniffer 2420B (which may be coupled to a switch 2445 or other network device forwarding network traffic between the client end stations 120 and the server end stations 1408). However, this non-inline deployment is not utilized in some embodiments utilizing the HPM 104, as in certain embodiments the HPM 104 may need to encrypt and/or decrypt data objects passing between the client end stations and that data object server(s) 108.

In other embodiments, however, the security gateway 1404 can operate as part of server end station(s) 1408 (for example, as a software module), or can be implemented using another type of electronic device and can be software, hardware, or a combination of both.

As used herein, a network device (e.g., a router, switch, bridge) is an electronic device that is a piece of networking equipment, including hardware and software, which communicatively interconnects other equipment on the network (e.g., other network devices, end stations). Some network devices are "multiple services network devices" that provide support for multiple networking functions (e.g., routing, bridging, switching), and/or provide support for multiple application services (e.g., data, voice, and video).

In FIG. 14, a set of one or more server end stations 1408 execute or otherwise implement the one or more data object servers 108, which can include a database server, a file server, a web application server, a mail server, print server, gaming server, application server, etc. In some embodiments, the data object server(s) 108 can include a web application server, which is system software (typically running "on top" of an operating system) executed by server hardware (e.g., server end stations 1408) upon which web applications run. Web applications are typically designed to interact with HTTP clients by dynamically generating HyperText Markup Language (HTML) and other content responsive to HTTP request messages sent by those HTTP clients. HTTP clients (e.g., non-illustrated software of any of client end stations 120) typically interact with web applications by transmitting HTTP request messages to web application servers, which execute portions of web applications and return web application data in the form of HTTP response messages back to the HTTP clients, where the web application data can be rendered using a web browser. Thus, HTTP functions as a request-response protocol in a client-server computing model, where the web application servers typically act as the "server" and the HTTP clients typically act as the "client." In some embodiments, a data object access request message can be an HTTP request message (e.g., a "GET" or "POST" message).

HTTP Resources are identified and located on a network by Uniform Resource Identifiers (URIs)—or, more specifically, Uniform Resource Locators (URLs)—using the HTTP or Hypertext Transfer Protocol over TLS/SSL (HTTPS) URI schemes. URLs are specific strings of characters that identify a particular reference available using the Internet. URLs typically contain a protocol identifier or scheme name (e.g. http/https/ftp), a colon, two slashes, and one or more of user credentials, server name, domain name, IP address, port, resource path, query string, and fragment identifier, which may be separated by periods and/or slashes. The original versions of HTTP—HTTP/0.9 and HTTP/1.0—were revised in Internet Engineering Task Force (IETF) Request for Comments (RFC) 2616 as HTTP/1.1, which is in common use today, although new versions of the HTTP protocol (e.g., HTTP/2, which is based upon the SPDY™ protocol largely developed by Google™) are also widely utilized.

A file server is system software (e.g., running on top of an operating system, or as part of an operating system itself) typically executed by one or more server end stations 1408 (each coupled to or including one or more storage devices) that allows applications or client end stations access to a file-system and/or files, typically allowing for the opening of files, reading of files, writing to files, and/or closing of files over a network. Although some file servers provide file-level access to storage, other file servers may provide block-level access to storage. File servers typically operate using any number of remote file-system access protocols, which allow client processes to access and/or manipulate remote files from across the Internet or within a same enterprise network (e.g., a corporate Intranet). Examples of remote file-system access protocols include, but are not limited to, Network File System (NFS), WebNFS, Server Message Block (SMB)/Common Internet File System (CIFS), File Transfer Protocol (FTP), Web Distributed Authoring and Versioning (WebDAV), Apple Filing Protocol (AFP), Remote File System (RFS), etc. Thus, a data object access request can comprise a request to read, write, delete, create, etc., a data object using a message following one of these protocols.

Another type of remote-file system access protocol is provided by Microsoft Sharepoint™, which is a web application platform providing content management and document and file management.

Figure 15:
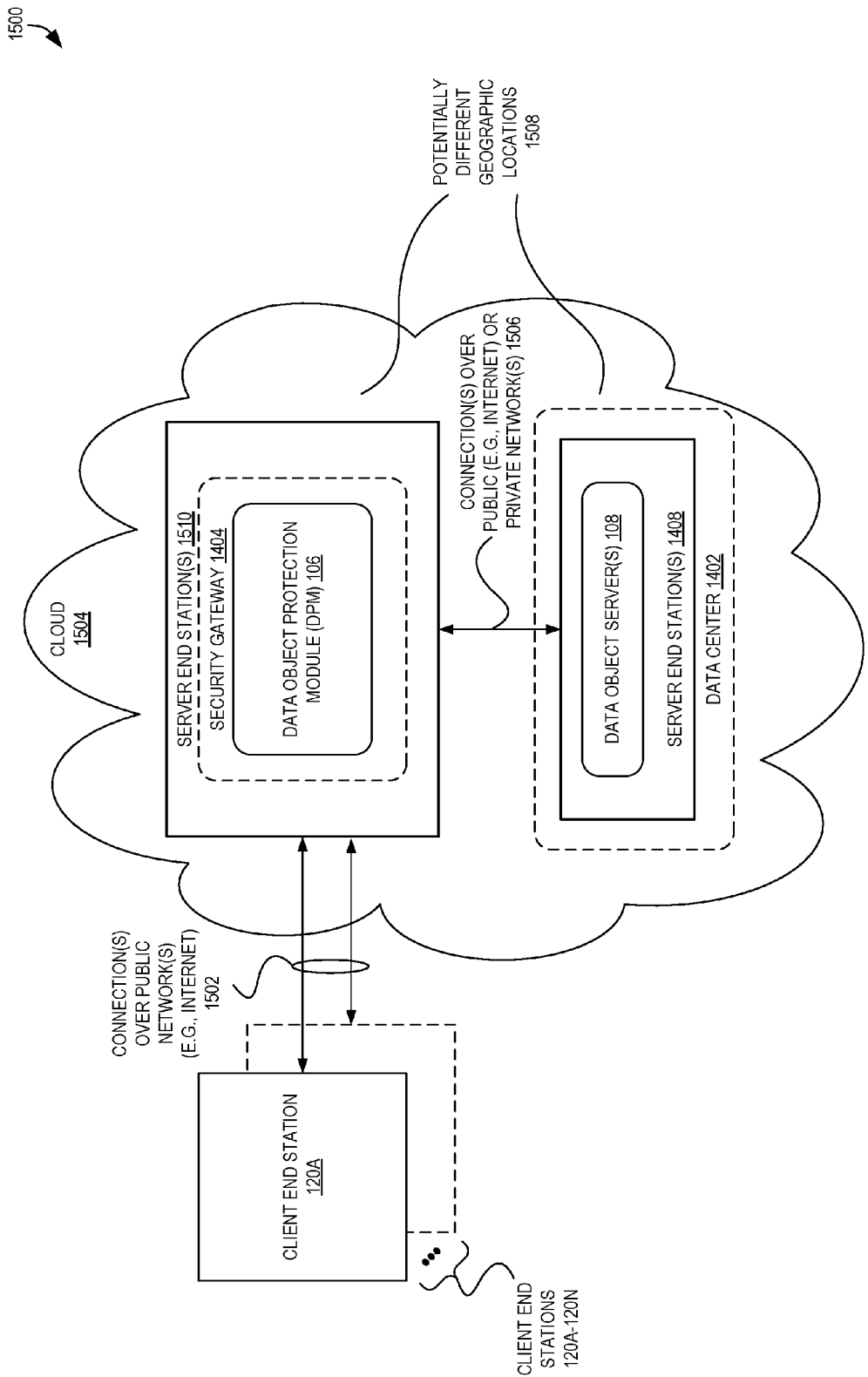
FIG. 15 is a block diagram illustrating an exemplary cloud-based deployment of a security gateway including a DPM according to some embodiments.

FIG. 15 is a block diagram illustrating an exemplary cloud-based deployment 1500 of a security gateway including a DPM 106 according to some embodiments. In contrast to the deployment 1400 of FIG. 14, in the depicted embodiment the DPM 106 (optionally acting as part of a security gateway 1404) executes at one or more server end stations 1510 in the "cloud" 1504, and thus communicate with the client end stations 120A-120N using connections over public networks 1502 (e.g., the Internet).

In different cloud deployments, the DPM 106 and the data object server(s) 108 can be implemented in a variety of locations. For example, in some embodiments the DPM 106 and the data object server(s) 108 are in different geographic locations 1508 and thus may communicate over public or private networks 1506. In other embodiments, though, the DPM 106 and the data object server(s) 108 can be implemented in a same geographic location, room, or even as part of a same set of one or more server end stations. Accordingly, the DPM 106 and the data object server(s) 108 could potentially communicate over only private networks 1506.

While the flow diagrams in the figures show a particular order of operations performed by certain embodiments, it should be understood that such order is exemplary (e.g., alternative embodiments may perform the operations in a different order, combine certain operations, overlap certain operations, etc.). One having ordinary skill in the art would recognize that variations can be made to the flow diagrams without departing from the broader spirit and scope of the invention.

Similarly, while the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a security gateway for preventing large-scale data breaches, wherein the security gateway is communicatively coupled between a plurality of client end stations and one or more servers that store and serve a plurality of files, the method comprising:

receiving, at the security gateway from one or more of the plurality of client end stations, a plurality of file access requests seeking access to files of the plurality of files stored by the one or more servers, wherein each of the plurality of file access requests includes an immutable identifier of one of the files, wherein the plurality of files have been divided into a first subset that are currently classified as active files and a second subset that are currently classified as inactive files, wherein the current classification of the plurality of files into active files and inactive files is based upon a likelihood of further legitimate access to the files;

determining, for each of the plurality of file access requests, whether the requested file is one of the first subset of the plurality of files that are currently classified as active files and thus is not in the second subset of the plurality of files that are currently classified inactive files, wherein the first subset includes less than fifty percent of the plurality of files, and wherein the second subset includes greater than fifty percent of the plurality of files;

for those of the plurality of file access requests requesting files determined to be in the first subset of the plurality of files that are currently classified as active files, subjecting those file access requests to a first protection layer including a first set of zero or more protection mechanisms; and for those of the plurality of file access requests involving files determined to not be in the first subset of the plurality of files that are currently classified as active files, subjecting those file access requests to a second protection layer including a second set of one or more protection mechanisms, wherein the first protection layer is more permissive than the second protection layer in that certain file access requests that would be deemed acceptable if submitted to the first protection layer would not be deemed acceptable if submitted to the second protection layer, and in that all file access requests that would be deemed acceptable if submitted to the second protection layer would be deemed acceptable if submitted to the first protection layer, whereby large-scale data breaches are efficiently prevented without disruption to legitimate file access requests.

2. The method of claim 1, wherein:
at least one of the one or more servers comprises a web server; and
at least one of the plurality of file access requests comprises a HyperText Transfer Protocol (HTTP) request.

3. The method of claim 1, wherein:
at least one of the one or more servers comprises a file server; and
at least one of the plurality of file access requests comprises either a Server Message Block (SMB) read request, a Common Internet File System (CIFS) read request, a Network File System (NFS) read request, or an Apple Filing Protocol (AFP) read request.

4. The method of claim 1, wherein the first subset includes less than ten percent of the plurality of files.

5. The method of claim 4, wherein the first subset includes less than one percent of the plurality of files.

6. The method of claim 1, wherein the first protection layer does not block any file access requests from being served while the second protection layer does block file access requests from being served.

7. The method of claim 6, wherein:
at least one of the one or more protection mechanisms of the second protection layer includes utilizing a grace amount for a user;
the grace amount for the user is adjusted for each access request submitted on behalf of the user for any file that is part of the second subset currently classified as inactive files; and
upon an exhaustion of the grace amount for the user, the security gateway is to at least temporarily block access to the files of the second subset for the user.

8. The method of claim 7, further comprising:
after the exhaustion of the grace amount, receiving an indication that a temporal allocation amount is to be used for the user as another of the one or more protection mechanisms of the second protection layer, wherein the temporal allocation amount is specific to the user and indicates an amount of accesses over another period of time that the user may make for files that are of the second subset before an additional temporal allocation amount is required or until the another period of time has ended.

9. The method of claim 6, wherein:
the first protection layer includes exactly zero protection mechanisms; and
at least one of the one or more servers utilizes an access control protection mechanism.

10. The method of claim 1, further comprising:
reclassifying a file of the first subset to the second subset so that any file access requests for that file will now be subject to the second protection layer as opposed to the first protection layer.

11. The method of claim 10, wherein the reclassifying comprises:
determining, based upon historic access information, that the file is to no longer be classified as one of the active files; and
updating a data structure that tracks those files currently in the first subset and not those files currently in the second subset to remove the file from the first subset.

12. The method of claim 11, wherein the determining that the file is to no longer to be classified as one of the active files comprises:
determining that the file has been accessed fewer than a first threshold number of times in a second threshold amount of time.

13. The method of claim 1, further comprising:
tracking in the security gateway those files currently in the first subset and not those files currently in the second subset to conserve resources since the first subset includes fewer of the plurality of files compared to the second subset and since the second protection layer is less permissive that the first protection layer.

14. The method of claim 1, further comprising:
after receipt of a request to write to a file in the second subset, reclassifying the file from the second subset to the first subset so that any subsequent file access requests for that file will now be subject to the first protection layer as opposed to the second protection layer.

15. The method of claim 1, further comprising:
encrypting, by the security gateway, one or more of the files currently classified as being inactive files;
receiving, at the security gateway, one of the one or more encrypted files from one of the one or more servers in response to one of the file access requests from one of the client end stations; and
transmitting, to the one client end station, a decrypted file resulting from the security gateway decrypting the one encrypted file.

16. The method of claim 15, wherein the decryption occurs using a key, wherein neither the one server nor the one client end station has access to the key.

17. The method of claim 1, wherein the second protection layer, for a first file access request from a first user for a first file, includes:
determining, by the security gateway, that the first user does not have a sufficient temporal allocation amount to perform the first file access; and
prohibiting, by the security gateway, the first file access request from being processed.

18. The method of claim 1, further comprising classifying one of the plurality of files to as one of the active files or one of the inactive files based upon one or more of:
an amount of time since the file was created;
a number of accesses of the file within a recent time period;
an amount of time since the file was last accessed;
a name of the file;

a file storage location or path of the file;
a size of the file; and
a creator of the file.

19. The method of claim 1, wherein the security gateway is located at a different geographic location than the one or more servers, and wherein the security gateway is communicatively coupled with both the plurality of client end stations and with the one or more servers over one or more public networks.

20. A security gateway comprising:
one or more processors; and
a non-transitory computer readable medium storing instructions which, when executed by the one or more processors, cause the security gateway to perform operations for preventing large-scale data breaches, wherein the security gateway is to be communicatively coupled between a plurality of client end stations and one or more servers that store and serve a plurality of files, the operations comprising:
receiving, from one or more of the plurality of client end stations, a plurality of file access requests seeking access to files of the plurality of files stored by the one or more servers, wherein each of the plurality of file access requests includes an immutable identifier of one of the files, wherein the plurality of files have been divided into a first subset that are currently classified as active files and a second subset that are currently classified as inactive files, wherein the current classification of the plurality of files into active files and inactive files is based upon a likelihood of further legitimate access to the files;
determining, for each of the plurality of file access requests, whether the requested file is one of the first subset of the plurality of files that are currently classified as active files and thus is not in the second subset of the plurality of files that are currently classified inactive files, wherein the first subset includes less than fifty percent of the plurality of files, and wherein the second subset includes more than fifty percent of the plurality of files;
for those of the plurality of file access requests requesting files determined to be in the first subset of the plurality of files that are currently classified as active files, subjecting those file access requests to a first protection layer including a first set of zero or more protection mechanisms; and
for those of the plurality of file access requests involving files determined to not be in the first subset of the plurality of files that are currently classified as active files, subjecting those file access requests to a second protection layer including a second set of one or more protection mechanisms, wherein the first protection layer is more permissive than the second protection layer in that certain file access requests that would be deemed acceptable if submitted to the first protection layer would not be deemed acceptable if submitted to the second protection layer, and in that all file access requests that would be deemed acceptable if submitted to the second protection layer would be deemed acceptable if submitted to the first protection layer, whereby large-scale data breaches are efficiently prevented without disruption to legitimate file access requests.

21. The security gateway of claim 20, wherein:
at least one of the one or more servers comprises a web server; and
at least one of the plurality of file access requests comprises a HyperText Transfer Protocol (HTTP) request.

22. The security gateway of claim 20, wherein:
at least one of the one or more servers comprises a file server; and
at least one of the plurality of file access requests comprises either a Server Message Block (SMB) read request, a Common Internet File System (CIFS) read request, a Network File System (NFS) read request, or an Apple Filing Protocol (AFP) read request.

23. The security gateway of claim 20, wherein the first subset includes less than ten percent of the plurality of files.

24. The security gateway of claim 23, wherein the first subset includes less than one percent of the plurality of files.

25. The security gateway of claim 20, wherein the first protection layer does not block any file access requests from being served while the second protection layer does block file access requests from being served.

26. The security gateway of claim 25, wherein:
at least one of the one or more protection mechanisms of the second protection layer includes utilizing a grace amount for a user;
the grace amount for the user is adjusted for each access request submitted on behalf of the user for any file that is part of the second subset currently classified as inactive files; and
upon an exhaustion of the grace amount for the user, the security gateway is to at least temporarily block access to the files of the second subset for the user.

27. The security gateway of claim 26, wherein the operations further comprise:
after the exhaustion of the grace amount, receiving an indication that a temporal allocation amount is to be used for the user as another of the one or more protection mechanisms of the second protection layer, wherein the temporal allocation amount is specific to the user and indicates an amount of accesses over another period of time that the user may make for files that are of the second subset before an additional temporal allocation amount is required or until the another period of time has ended.

28. The security gateway of claim 25, wherein:
the first protection layer includes exactly zero protection mechanisms; and
at least one of the one or more servers utilizes an access control protection mechanism.

29. The security gateway of claim 20, wherein the operations further comprise:
reclassifying a file of the first subset to the second subset so that any file access requests for that file will now be subject to the second protection layer as opposed to the first protection layer.

30. The security gateway of claim 29, wherein the reclassifying comprises:
determining, based upon historic access information, that the file is to no longer be classified as one of the active files; and
updating a data structure that tracks those files currently in the first subset and not those files currently in the second subset to remove the file from the first subset.

31. The security gateway of claim 30, wherein the determining that the file is to no longer to be classified as one of the active files comprises:
determining that the file has been accessed fewer than a first threshold number of times in a second threshold amount of time.

32. The security gateway of claim 20, wherein the operations further comprise:
tracking in the security gateway those files currently in the first subset and not those files currently in the second subset to conserve resources since the first subset includes fewer of the plurality of files compared to the second subset and since the second protection layer is less permissive that the first protection layer.

33. The security gateway of claim 20, wherein the operations further comprise:
after receipt of a request to write to a file in the second subset, reclassifying the file from the second subset to the first subset so that any subsequent file access requests for that file will now be subject to the first protection layer as opposed to the second protection layer.

34. The security gateway of claim 20, wherein the operations further comprise:
encrypting one or more of the files currently classified as being inactive files;
receiving one of the one or more encrypted files from one of the one or more servers in response to one of the file access requests from one of the client end stations; and
transmitting, to the one client end station, a decrypted file resulting from decrypting the one encrypted file.

35. The security gateway of claim 34, wherein the decryption occurs using a key, wherein neither the one server nor the one client end station has access to the key.

36. The security gateway of claim 20, wherein the second protection layer, for a first file access request from a first user for a first file, includes:
determining that the first user does not have a sufficient temporal allocation amount to perform the first file access; and
prohibiting the first file access request from being processed.

37. The security gateway of claim 20, wherein the operations further comprise classifying one of the plurality of files to as one of the active files or one of the inactive files based upon one or more of:
an amount of time since the file was created;
a number of accesses of the file within a recent time period;
an amount of time since the file was last accessed;
a name of the file;
a file storage location or path of the file;
a size of the file; and
a creator of the file.

38. The security gateway of claim 20, wherein the security gateway is located at a different geographic location than the one or more servers, and wherein the security gateway is communicatively coupled with both the plurality of client end stations and with the one or more servers over one or more public networks.

* * * * *